(12) United States Patent
Ben Henda et al.

(10) Patent No.: US 11,564,087 B2
(45) Date of Patent: Jan. 24, 2023

(54) MISSION-CRITICAL PUSH-TO-TALK

(71) Applicant: TELEFONAKTIEBOLAGET LM ERICSSON (PUBL), Stockholm (SE)

(72) Inventors: Noamen Ben Henda, Stockholm (SE); Ivo Sedlacek, Hovorcovice (CZ)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 722 days.

(21) Appl. No.: 16/347,455

(22) PCT Filed: Nov. 7, 2017

(86) PCT No.: PCT/EP2017/078425
§ 371 (c)(1),
(2) Date: May 3, 2019

(87) PCT Pub. No.: WO2018/083327
PCT Pub. Date: May 11, 2018

(65) Prior Publication Data
US 2019/0335328 A1   Oct. 31, 2019

Related U.S. Application Data

(60) Provisional application No. 62/418,608, filed on Nov. 7, 2016.

(51) Int. Cl.
*H04W 12/04* (2021.01)
*H04W 4/08* (2009.01)
(Continued)

(52) U.S. Cl.
CPC ............. *H04W 12/04* (2013.01); *H04W 4/08* (2013.01); *H04W 4/10* (2013.01); *H04W 12/03* (2021.01)

(58) Field of Classification Search
CPC ... H04W 12/001; H04W 12/03; H04W 12/02; H04W 12/04; H04W 12/75; H04W 12/76;
(Continued)

(56) References Cited

U.S. PATENT DOCUMENTS 8,462,742 B2 *  6/2013  Song ................. H04W 12/0431
                                                         370/338
8,775,404 B1 *  7/2014  Peden ............... H04M 1/27453
                                                         707/709
(Continued)

FOREIGN PATENT DOCUMENTS

WO    2015144196 A1    10/2015
WO    2016003750 A1    1/2016

OTHER PUBLICATIONS

International Search Report and the Written Opinion of the International Searching Authority, issued in corresponding International Application No. PCT/EP2017/078425, dated Jan. 18, 2018, 19 pages.
(Continued)

*Primary Examiner* — Amare F Tabor
(74) *Attorney, Agent, or Firm* — Rothwell, Figg, Ernst & Manbeck, P.C.

(57) ABSTRACT

A user equipment is configured for concealment of a mission-critical push-to-talk (MCPTT) group identity in multimedia broadcast multicast services (MBMS). The UE is configured in particular to receive an indication of an MCPTT group pseudonym (7) which is a pseudonym for an MCPTT group identity (11) that identifies an MCPTT group of which the UE is a member. The UE may for example receive this indication from a group management server (GMS) or an MCPTT server. The UE in some embodiments may determine whether received control signalling (e.g., an MBMS subchannel control message) is for the MCPTT
(Continued)

group of which the UE is a member, by determining whether the control signaling includes the MCPTT group pseudonym (7).

21 Claims, 9 Drawing Sheets

(51) Int. Cl.
*H04W 4/10* (2009.01)
*H04W 12/03* (2021.01)

(58) Field of Classification Search
CPC ........... H04W 4/06; H04W 4/10; H04W 4/08; H04L 63/0407; H04L 63/065; H04L 63/0421; H04L 37/146; H04L 37/141
USPC ............................................................ 726/7
See application file for complete search history.

(56) References Cited

U.S. PATENT DOCUMENTS

| | | | | |
|---|---|---|---|---|
| 9,144,103 | B2 * | 9/2015 | Klein | H04W 76/14 |
| 9,530,026 | B2 * | 12/2016 | Zhang | H04L 9/3268 |
| 9,706,399 | B2 * | 7/2017 | Leppanen | H04W 12/041 |
| 9,860,069 | B2 * | 1/2018 | Patey | H04L 9/3268 |
| 10,944,551 | B2 * | 3/2021 | Yan | H04W 88/04 |
| 2009/0178121 | A1 * | 7/2009 | Luttge | H04L 63/104 726/4 |
| 2012/0057697 | A1 | 3/2012 | Holtmanns et al. | |
| 2012/0148050 | A1 | 6/2012 | Lewis et al. | |
| 2014/0357226 | A1 * | 12/2014 | Charugundla | H04W 4/023 455/411 |

OTHER PUBLICATIONS

3GPP, 3rd Generation Partnership Project; Technical Specification Group Services and System Aspects; Functional architecture and information flows to support mission critical communication services; Stage 2 (Release 13), 3GPP TS 23.179, V13.3.0 (Sep. 2016), 228 pages.

3GPP, 3rd Generation Partnership Project; Technical Specification Group Services and System Aspects; Security of Mission Critical Push To Talk (MCPTT) over LTE; (Release 13), 3GPP TS 33.179, V13.2.0 (Sep. 2016), 87 pages.

3GPP, 3rd Generation Partnership Project; Technical Specification Group Services and System Aspects Study on Mission Critical Security Enhancements (Release 14), 3GPP TR 33.880, V1.3.0 (Jun. 2017), 74 pages.

Ericsson, 3GPP TSG-SA WG3 Meeting #86, S3-170213, Feb. 6-10, 2017, "Solution for the concealment of group identifiers using group specific pseudonyms" 3 pages.

Ericsson, 3GPP TSG-SA WG3 Meeting #86, S3-170214, Feb. 6-10, 2017, "Solution for the concealment of group identifiers using session specific pseudonyms" 3 pages.

3GPP, 3rd Generation Partnership Project; Technical Specification Group Services and System Aspects Study on mission critical security enhancements (Release 14), 3GPP TR 33.880, V0.1.0 (Jul. 2016), 22 pages.

* cited by examiner

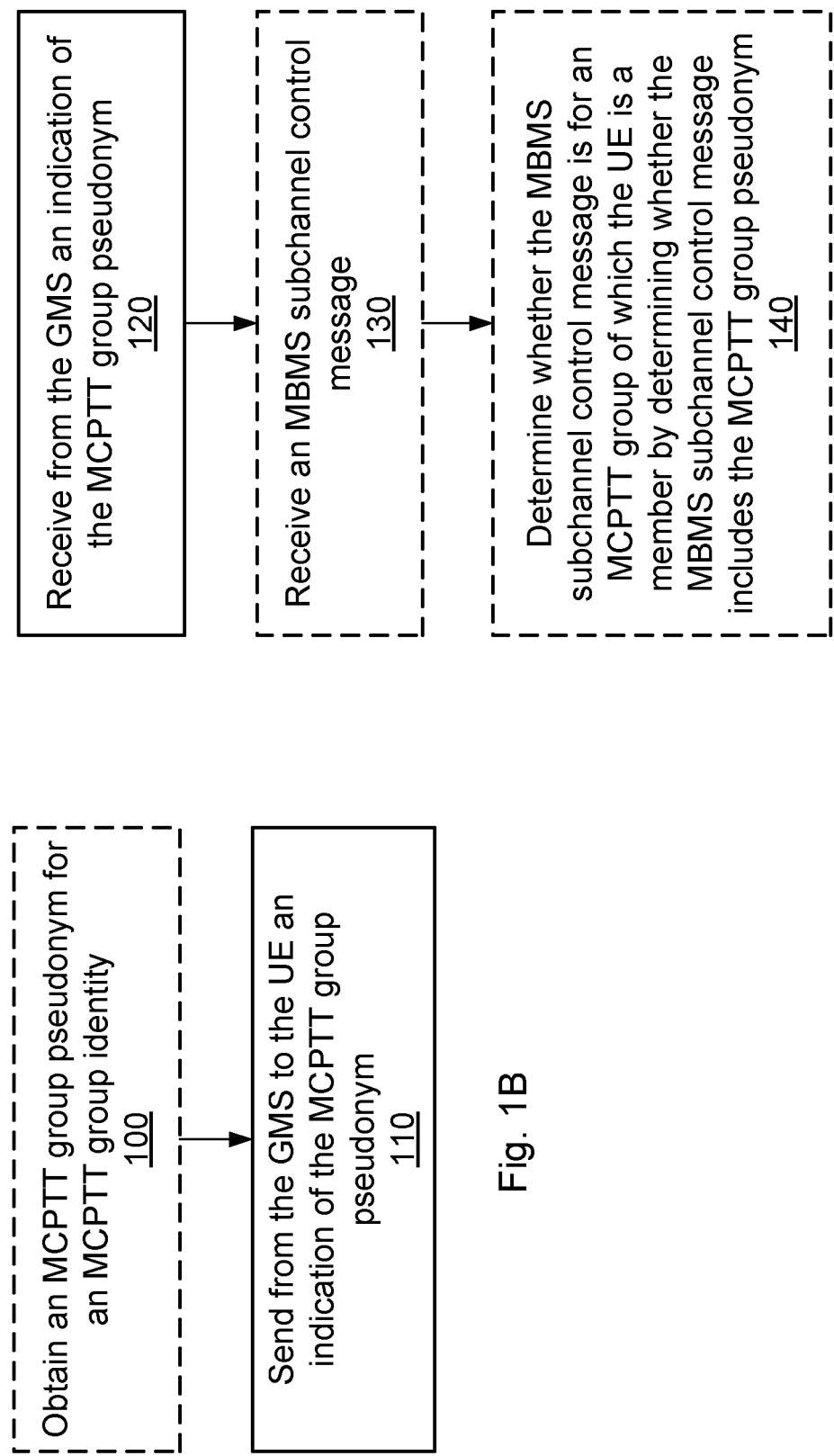

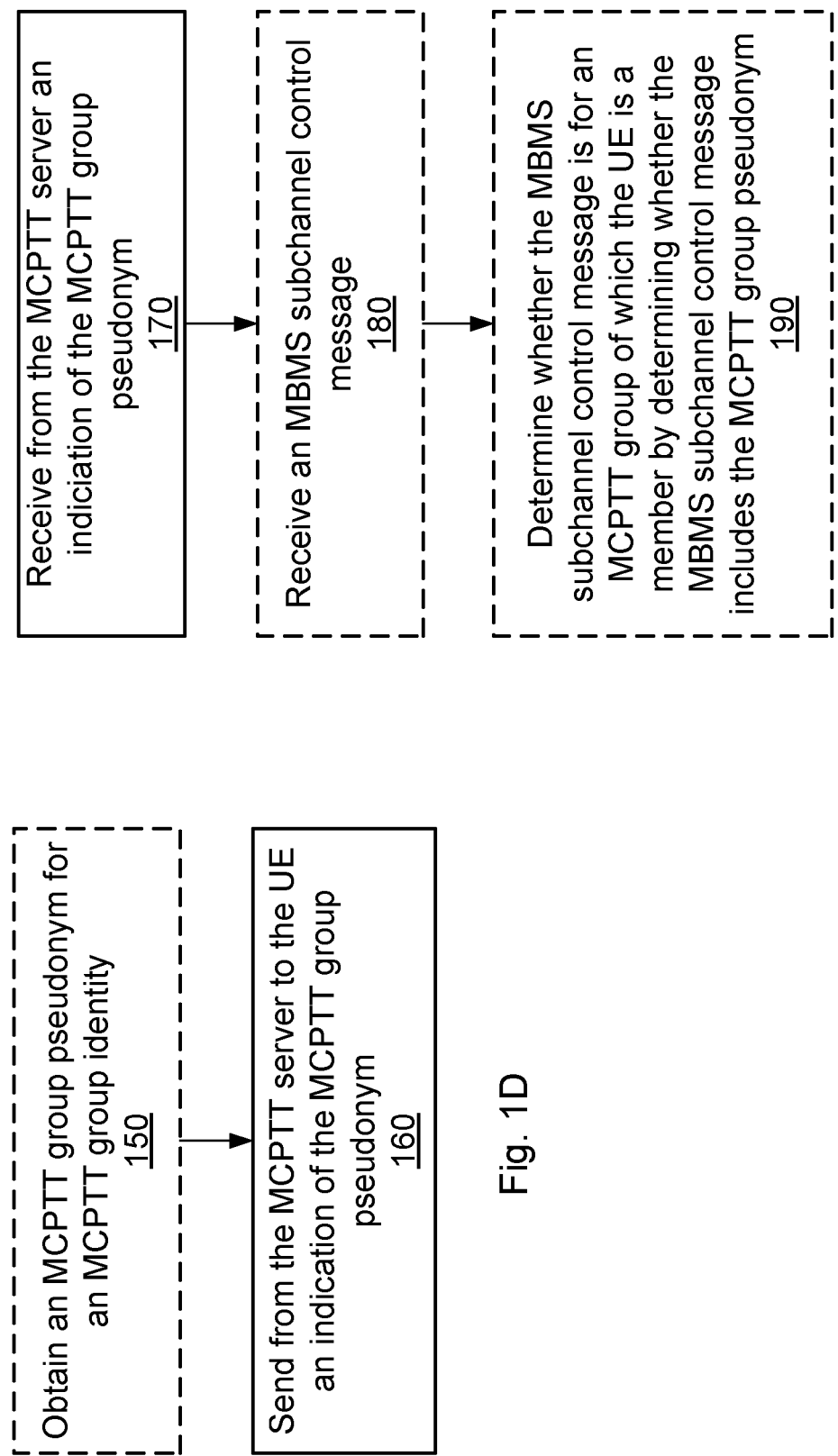

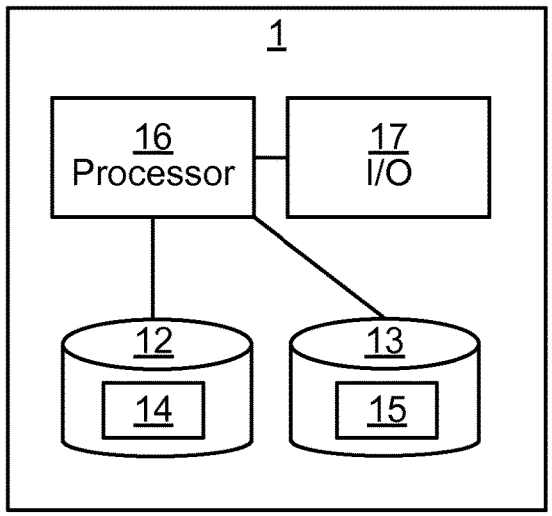
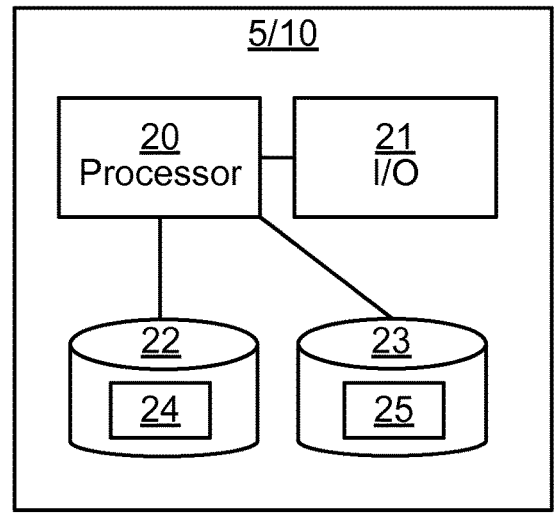
Fig. 8
Fig. 9
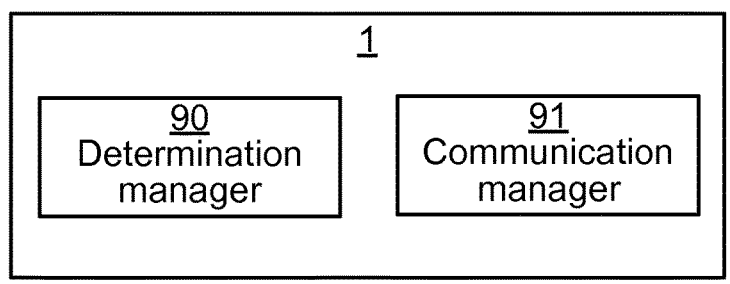
Fig. 10
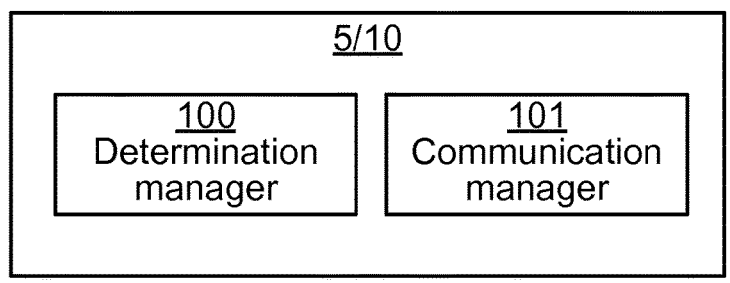
Fig. 11

MISSION-CRITICAL PUSH-TO-TALK

RELATED APPLICATIONS

This application is a 35 U.S.C. § 371 National Phase Entry Application from PCT/EP2017/078425, filed Nov. 7, 2017, designating the United States, and also claims the benefit of U.S. Provisional Application No. 62/418,608, filed Nov. 7, 2016, the disclosures of which are incorporated herein by reference in their entirety.

TECHNICAL FIELD

The present application relates generally to mission-critical push-to-talk (MCPTT), and more particularly to concealing a MCPTT group identifier.

BACKGROUND

Mission critical communication services are services that require preferential handling compared to normal communications, e.g., in support of police, firemen, or other public safety applications as well as for general commercial applications such as utility companies and railways. Mission-critical push-to-talk (MCPTT) services provide mission-critical communication services in a way that facilitates communication between multiple users that each have the ability to gain access to the permission to talk in an arbitrated manner.

When Multimedia Broadcast Multicast Services (MBMS) are used for MCPTT, an MCPTT server generates MBMS subchannel control messages as described in clause 4.2.3 of technical specification (TS) 24.380 of 3rd Generation Partnership Project (3GPP). These messages together with Real-time Transport Protocol (RTP) media packets and floor control messages are distributed over MBMS bearers. The MBMS subchannel control messages are for example used to signal to MCPTT user equipments (UE)s participating in a group call when to switch from unicast to multicast bearer or vice versa. An MBMS subchannel control message includes an MCPTT group identity that identifies the MCPTT group to which the MBMS subchannel control message is directed. The format and type of MBMS subchannel control messages are described in clause 8.4 of TS 24.380.

Currently, only two types of MBMS subchannel control messages are specified, namely the Map Group to Bearer and the Unmap Group to Bearer messages. The former is used to signal to MCPTT clients when to move from unicast to MBMS bearer while the latter signals the move in the other direction.

An MBMS bearer is uniquely identified by a Temporary Mobile Group Identity (TMGI) and defines a pool of resources on which media packets and floor control messages for different ongoing group call sessions can be distributed in parallel. With each MBMS bearer, a general purpose subchannel is associated. This subchannel may be accessible to some MCPTT UEs within the service area of the MBMS bearer and is used in particular for the distribution of the MBMS subchannel control messages.

SUMMARY

Embodiments herein conceal a mission-critical push-to-talk (MCPTT) group identity in multimedia broadcast multicast services (MBMS). Some embodiments for example exploit an MCPTT group pseudonym that serves as a pseudonym for an MCPTT group's identity, e.g., in such a way that use of the MCPTT group pseudonym does not reveal the MCPTT group identity. In one or more embodiments, then, an MBMS subchannel control message includes the MCPTT group pseudonym for the MCPTT group to which the message is directed (e.g., instead of the MCPTT group's actual identity), so as to conceal from MCPTT users who are not members of the particular MCPTT group to which the message is directed the identity of the particular MCPTT group to which the message is directed. In some cases, this advantageously secures MCPTT services by preventing a user equipment (UE) within the service area of an active MBMS bearer from identifying which particular MCPTT groups are currently active in the same area.

According to a first aspect there is presented a method for concealment a MCPTT group identifier in MBMS. The method is performed by a user equipment (UE), and comprises receiving from a group management server (GMS) an indication of an MCPTT group pseudonym which is a pseudonym for an MCPTT group identity that identifies an MCPTT group of which the UE is a member.

In some embodiments, the method further comprises using the MCPTT group pseudonym instead of the MCPTT group identity in MCPTT group call communication. Alternatively or additionally, the method in some embodiments may further comprises receiving an MBMS subchannel control message on an MBMS subchannel protected by a key accessible to any UE that is a member of at least one MCPTT group whose MBMS subchannel control messages are sent on the MBMS subchannel; and determining whether the MBMS subchannel control message is for the MCPTT group of which the UE is a member by determining whether the MBMS subchannel control message includes the MCPTT group pseudonym for the MCPTT group identity that identifies the MCPTT group.

In some embodiments, the MCPTT group pseudonym is defined as a function of certain parameters, and the indication comprises the certain parameters based on which the MCPTT group pseudonym is able to be generated according to the function. In one embodiment, for example, the certain parameters include a group specific secret parameter and known information that is known by both the UE and the GMS. Alternatively or additionally, the certain parameters include the MCPTT group identity and a group master key (GMK) for the MCPTT group.

In other embodiments, the indication comprises the MCPTT group pseudonym itself. In one such embodiment, for instance, the MCPTT group pseudonym is a randomly generated pseudonym.

In some embodiments, the MCPTT group pseudonym is a changed MCPTT group pseudonym that is changed from a previous MCPTT group pseudonym that was previously a pseudonym for the same MCPTT group identity.

In any of these embodiments, the indication of the MCPTT group pseudonym may be included in a group notification message sent from the GMS to the UE. The group notification message may for instance contain a MIKEY-SAKKE I_MESSAGE including the indication of the MCPTT group pseudonym. The indication in this case may be included in a general extension payload of the MIKEY-SAKKE I_MESSAGE of the group notification message.

Alternatively, the indication of the MCPTT group pseudonym may be included in a client server key (CSK)/signalling protection key (SPK) encrypted message sent from the GMS to the UE.

According to a second aspect there is presented a method for concealment of a mission-critical push-to-talk (MCPTT) group identifier in multimedia broadcast multicast services (MBMS). The method is performed in a group management server (GMS) and comprises sending from the GMS to a user equipment (UE) an indication of an MCPTT group pseudonym which is a pseudonym for an MCPTT group identity that identifies an MCPTT group of which the UE is a member.

In some embodiments, the MCPTT group pseudonym is defined as a function of certain parameters, and the indication comprises the certain parameters based on which the MCPTT group pseudonym is able to be generated according to the function. In one embodiment, for example, the certain parameters include a group specific secret parameter and known information that is known by both the UE and the GMS. Alternatively or additionally, the certain parameters include the MCPTT group identity and a group master key (GMK) for the MCPTT group.

In other embodiments, the indication comprises the MCPTT group pseudonym itself. In one such embodiment, for instance, the MCPTT group pseudonym is a randomly generated pseudonym.

In some embodiments, the MCPTT group pseudonym is a changed MCPTT group pseudonym that is changed from a previous MCPTT group pseudonym that was previously a pseudonym for the same MCPTT group identity.

In any of these embodiments, the indication of the MCPTT group pseudonym may be included in a group notification message sent from the GMS to the UE. The group notification message may for instance contain a MIKEY-SAKKE I_MESSAGE including the indication of the MCPTT group pseudonym. The indication in this case may be included in a general extension payload of the MIKEY-SAKKE I_MESSAGE of the group notification message.

Alternatively, the indication of the MCPTT group pseudonym may be included in a client server key (CSK)/signalling protection key (SPK) encrypted message sent from the GMS to the UE.

According to a third aspect there is presented a method for concealment of a mission-critical push-to-talk (MCPTT) group identifier in multimedia broadcast multicast services (MBMS). The method is performed in a user equipment (UE) and comprises receiving rom an MCPTT server an indication of an MCPTT group pseudonym which is a pseudonym for an MCPTT group identity that identifies an MCPTT group of which the UE is a member.

In some embodiments, the method further comprises using the MCPTT group pseudonym instead of the MCPTT group identity in MCPTT group call communication. Alternatively or additionally, the method in some embodiments may further comprises receiving an MBMS subchannel control message on an MBMS subchannel protected by a key accessible to any UE that is a member of at least one MCPTT group whose MBMS subchannel control messages are sent on the MBMS subchannel; and determining whether the MBMS subchannel control message is for the MCPTT group of which the UE is a member by determining whether the MBMS subchannel control message includes the MCPTT group pseudonym for the MCPTT group identity that identifies the MCPTT group.

In some embodiments, the MCPTT group pseudonym is defined as a function of certain parameters, and the indication comprises the certain parameters based on which the MCPTT group pseudonym is able to be generated according to the function. In one embodiment, for example, the certain parameters include a group specific secret parameter and known information that is known by both the UE and the GMS. Alternatively or additionally, the certain parameters include the MCPTT group identity and a group master key (GMK) for the MCPTT group.

In other embodiments, the indication comprises the MCPTT group pseudonym itself. In one such embodiment, for instance, the MCPTT group pseudonym is a randomly generated pseudonym.

In some embodiments, the MCPTT group pseudonym is specific to a call session in which the UE is a participant.

In some embodiments, the MCPTT group pseudonym is sent from the MCPTT server to the UE during a call setup procedure. For example, in some embodiments, the MCPTT group pseudonym is included in a group call response sent from the MCPTT server to the UE.

According to a fourth aspect there is presented a method for concealment of a mission-critical push-to-talk (MCPTT) group identifier in multimedia broadcast multicast services (MBMS). The method is in a MCPTT server and comprises sending to a user equipment (UE) an indication of an MCPTT group pseudonym which is a pseudonym for an MCPTT group identity that identifies an MCPTT group of which the UE is a member.

The method may also further comprise generating or receiving the MCPTT group pseudonym, and sending the generated or received MCPTT group pseudonym.

In some embodiments, the method further comprises generating an MBMS subchannel control message to include the MCPTT group pseudonym in order to indicate that the MBMS subchannel control message is for the MCPTT group identified by the MCPTT group identity, and sending the MBMS subchannel control message on an MBMS subchannel protected by a key accessible to any UE that is a member of at least one MCPTT group whose MBMS subchannel control messages are sent on the MBMS subchannel.

Alternatively or additionally, the method may further comprise using the MCPTT group pseudonym instead of the MCPTT group identity in MCPTT group call communication.

In some embodiments, the MCPTT group pseudonym is defined as a function of certain parameters, and the indication comprises the certain parameters based on which the MCPTT group pseudonym is able to be generated according to the function. In one embodiment, for example, the certain parameters include a group specific secret parameter and known information that is known by both the UE and the GMS. Alternatively or additionally, the certain parameters include the MCPTT group identity and a group master key (GMK) for the MCPTT group.

In other embodiments, the indication comprises the MCPTT group pseudonym itself. In one such embodiment, for instance, the MCPTT group pseudonym is a randomly generated pseudonym.

In some embodiments, the MCPTT group pseudonym is specific to a call session in which the UE is a participant.

In some embodiments, the MCPTT group pseudonym is sent from the MCPTT server to the UE during a call setup procedure. For example, in some embodiments, the MCPTT group pseudonym is included in a group call response sent from the MCPTT server to the UE.

Other embodiments herein include corresponding apparatus, computer programs, and carriers (e.g., computer program products).

BRIEF DESCRIPTION OF THE DRAWINGS

Some embodiments are now described, by way of example, with reference to the accompanying drawings, in which:

FIG. 1B is a logic flow diagram of a method performed by a group management server (GMS) according to some embodiments.

FIG. 1C is a logic flow diagram of a method performed by a UE according to some embodiments.

FIG. 1D is a logic flow diagram of a method performed by an MCPTT server according to some embodiments.

FIG. 1E is a logic flow diagram of a method performed by a UE according to some embodiments.

FIGS. 8-9 are schematic diagrams illustrating some components of devices presented herein; and FIGS. 10-11 are schematic diagrams showing functional modules of devices presented herein.

DETAILED DESCRIPTION

Figure 1A:
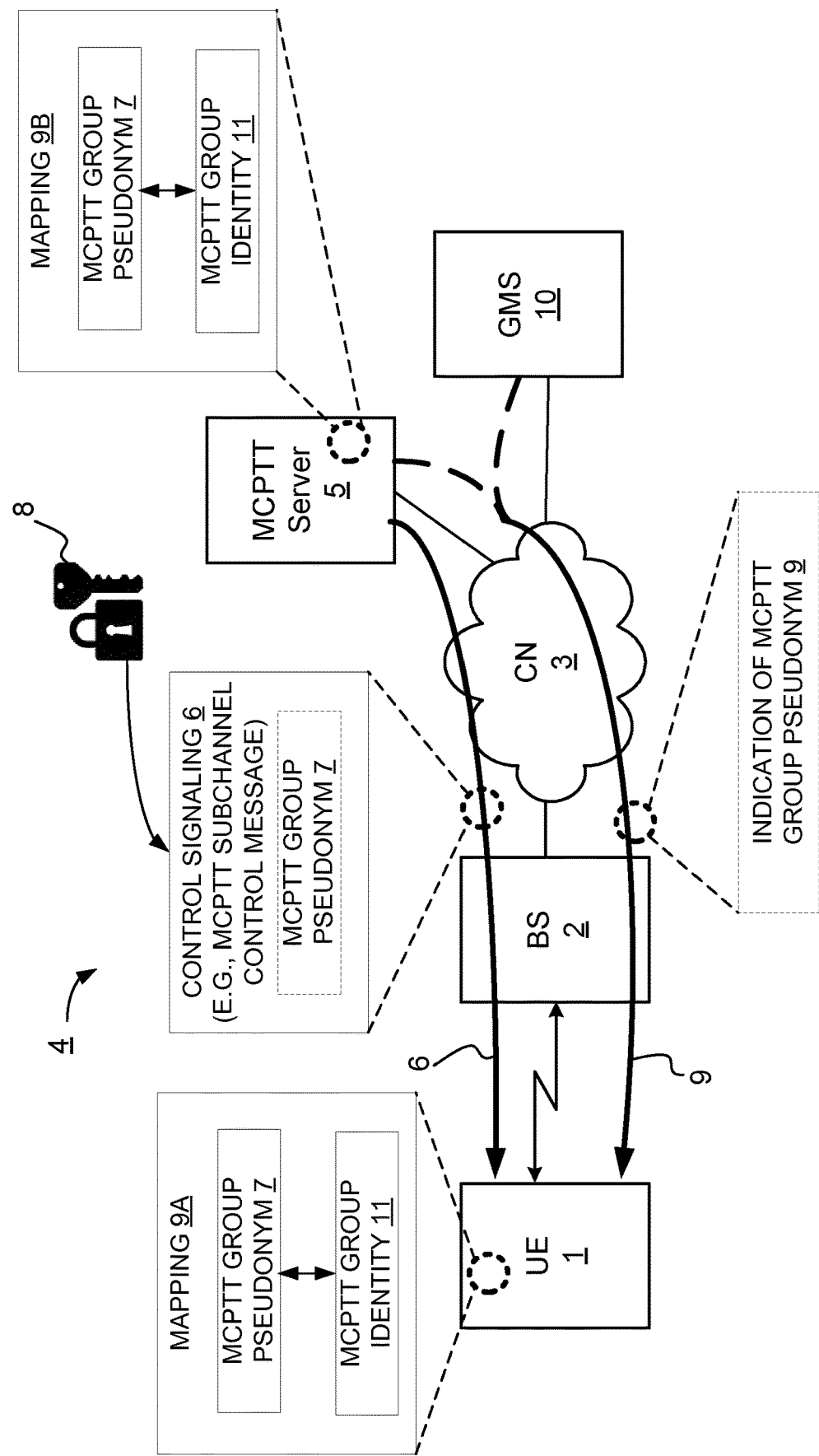
FIG. 1A is a schematic diagram illustrating an environment where embodiments presented herein can be applied.

FIG. 1A shows a network 4 in which some embodiments herein may be implemented. The network 4 as shown includes a user equipment (UE) 1 that is wirelessly connectable to a base station (BS) 2, e.g., in a radio access network. The BS 2 is in turn connected to a core network (CN) 3, e.g., for providing the UE 1 with access to one or more data networks and/or service providers such as a mission-critical push-to-talk (MCPTT) service provider.

FIG. 1A in this regard shows an MCPTT server 5 that may be internal or external to the CN 3 for providing centralized support for MCPTT services of a service provider. The MCPTT server 5 supports one or more groups of MCPTT clients (e.g., UEs) referred to as MCPTT groups, where each MCPTT group is identified by a respective MCPTT group identity (e.g., in the form of a uniform resource identifier, URI). The MCPTT server 5 in particular facilitates group call communication between the MCPTT clients of an MCPTT group, with each client having the ability to gain access to the permission to talk in an arbitrated manner. The MCPTT server 5 may for instance perform call control, as well as determine for each MCPTT client involved in a given call whether to use unicast or multicast transport.

Configured in this way, the MCPTT server 5 may transmit control signalling 6 to UE 1, e.g., as part of controlling an MCPTT group call in which the UE 1 is participating or invited to participate as an MCPTT client. Such control signalling 6 as shown in FIG. 1A may for example involve the MCPTT server 5 transmitting a multimedia broadcast multicast services (MBMS) subchannel control message 7 to the UE 1, e.g., to control whether the UE 1 is to use unicast or MBMS for the group call transport. In at least some embodiments, the MBMS subchannel control message is sent on an (general purpose) MBMS subchannel shared by multiple MCPTT groups within the service area of an active MBMS bearer. Accordingly, for this and other types of control signalling 6, the MCPTT server 5 indicates to which MCPTT group the signaling 6 is directed.

Notably, the MCPTT server 5 according to some embodiments indicates to which MCPTT group the control signalling 6 is directed using a pseudonym 7 for an MCPTT group's identity e.g., instead of using a group's MCPTT group identity itself. The pseudonym 7 for an MCPTT group identity (referred to as an MCPTT group pseudonym or alias) may differ from the MCPTT group identity, e.g., in terms of its content and/or format. The pseudonym 7 for a group's identity may for instance be a different URI than the group's identity. Regardless, knowledge about which particular MCPPT group identity an MCPTT group pseudonym 7 serves as a pseudonym for is disclosed only to certain UEs, e.g., those UEs that are members of the MCPTT group or those UEs that are both members of the MCPTT group and actual/invited participants in a certain call session of the MCPTT group. This way, use of the MCPTT group pseudonym 7 in control signalling 6 is not traceable to the MCPTT group identity except by the MCPTT group's own members or by the participants of the call session of the MCPTT group. In some cases, this advantageously secures MCPTT services by preventing another UE within the service area of an active MBMS bearer from identifying which MCPTT groups are currently active in the same area.

In some embodiments, for example, the MBMS subchannel may be protected by a key 8 accessible to any UE that is a member of at least one MCPTT group whose MBMS subchannel control messages are sent on that MBMS subchannel. The key 8 may be for instance an MBMS bearer-specific key (e.g., an MBMS subchannel control key, MSCCK) or a participating function key (PFK) used for the derivation of a MSCCK. No matter the particular nature or type of the key 8, the key 8 in some embodiments protects the confidentiality and/or integrity of the MBMS subchannel. Because the key 8 is shared with any UE that is a member of at least one MCPTT group whose MBMS subchannel control messages are sent on the MBMS subchannel, though, any such UE may inspect the control signalling 6 to determine whether the control signalling 6 is directed to it. Were an MCPTT group's identity itself used to indicate to which UEs (e.g., which MCPTT group) the control signalling 6 is directed, the presence of the identified MCPTT group would be revealed to prying UEs and could therefore be exploitable for malicious purposes. By instead using the MCPTT group pseudonym 7 to indicate to which UEs the control signalling 6 is directed, prying UEs may not be able to trace the control signalling 6 to the MCPTT group identity so as to detect the presence of UEs belonging to the MCPTT group.

In fact, in some embodiments, the MCPTT group pseudonym 7 that serves as a pseudonym for an MCPTT group identity may be occasionally or periodically changed. This way, for example, control signalling 6 sent at different times to that MCPTT group may include different MCPTT group pseudonyms (e.g., as randomly generated), so as to prevent prying UEs from even tracing control signalling 6 to the same MCPTT group pseudonym. That is, though a prying UE may observe at one point in time that control signalling 6 includes a certain MCPTT group pseudonym, the pseudonym may thereafter be changed so that a prying UE cannot later observe the control signalling 6 as including the same pseudonym and thereby infer that the same MCPTT group is present as was before when the pseudonym was first observed. The pseudonym may for example be changed or updated in this way each time a call session is initiated amongst members of the MCPTT group, e.g., so that the MCPTT group pseudonym is bound or otherwise specific to a call session of an MCPTT group. In fact, in some embodiments multiple different call session ongoing amongst different members of the same MCPTT group mean that there are multiple different MCPTT pseudonyms in use at the same time for the same MCPTT group identity, Alternatively or additionally, the pseudonym may be changed or updated at any number of times or events (e.g., after the pseudonym is used a threshold number of times) that occur often enough to thwart tracing (but not so often as to impose unnecessary overhead), e.g., according to MCPTT server or GMS policy.

In support of using an MCPTT group pseudonym instead of an MCPTT group identity, a server may signal or otherwise indicate to a UE 1 an MCPTT group pseudonym 7 which is a pseudonym for an MCPTT group identity that identifies an MCPTT group of which the UE 1 is a member. FIG. 1A for instance shows that in some embodiments the MCPTT server 5 itself sends an indication 9 of the MCPTT group pseudonym 7 to the UE 1 such that the UE 1 correspondingly receives that indication 9 from the MCPTT server 5. FIG. 1A also shows that in other embodiments a group management server (GMS) 10 may alternatively send the indication 9 of the MCPTT group pseudonym 7 to the UE 1 such that the UE 1 correspondingly receives that indication 9 from the GMS 10. In either case, the indication 9 in some embodiments may comprise (or otherwise directly indicate) the MCPTT group pseudonym 7 itself, e.g., in the form of an MCPTT group pseudonym field. In other embodiments, by contrast, the indication 9 may comprise certain parameters based on which the MCPTT group pseudonym 7 is able to be generated according to a certain function. The parameters may include for instance a group specific secret parameter (e.g., a group master key, GMK) and information known by both the UE and the GMS/MCPTT server (e.g., the MCPTT group identity 11).

In any event, the UE 1 based on this indication 9 may in some embodiments maintain a mapping 9A or other association between the indicated MCPTT group pseudonym 7 and an MCPTT group identity 11 for which the MCPTT group pseudonym 7 serves as a pseudonym. The MCPTT server 5 may maintain a similar mapping 9B or association. The MCPTT server 5 in this case uses its mapping 9B to determine which MCPTT group pseudonym 7 to include in control signalling 6 in order to direct the control signalling 6 to an MCPTT group identified by a particular MCPTT group identity 11. Correspondingly, the UE 1 uses its mapping 9A to determine whether received control signalling 6 is directed to an MCPTT group of which the UE 1 is a member, e.g., by determining whether the control signalling 6 includes the MCPTT group pseudonym 7 for the MCPTT group identity 11 that identifies the MCPTT group of which the UE is a member.

In view of the above, FIG. 1B shows a method performed by GMS 10 according to some embodiments for concealment of an MCPTT group identity 11. The method as shown includes sending from the GMS 10 to the UE 1 an indication 9 of an MCPTT group pseudonym 7, e.g., which is a pseudonym for an MCPTT group identity 11 that identifies an MCPTT group of which the UE 1 is a member (Block 110). The indication 9 may be for instance the MCPTT group pseudonym 7 itself or may be certain parameters based on which the MCPTT group pseudonym 7 is able to be generated according to a function. In some embodiments, the indication 9 may be included in a group notification message that notifies the UE 1 of information about the MCPTT group of which it is a member. Regardless, at least in embodiments where the indication 9 comprises the MCPTT group pseudonym 7 itself, the method may further include the GMS 10 obtaining (e.g., receiving or generating) the MCPTT group pseudonym 7 for the MCPTT group identity 11 (Block 100). The GMS 10 may for instance randomly generate the the MCPTT group pseudonym 7, e.g., to look like a random string.

FIG. 1C shows a corresponding method performed by UE 1 according to some embodiments for concealment of an MCPTT group identity 11. The method as shown includes receiving from the GMS 10 an indication 9 of an MCPTT group pseudonym 7, e.g., which is a pseudonym for an MCPTT group identity 11 that identifies an MCPTT group of which the UE 1 is a member (Block 120). Again, the indication 9 may be for instance the MCPTT group pseudonym 7 itself or may be certain parameters based on which the MCPTT group pseudonym 7 is able to be generated according to a function. In some embodiments, the indication 9 may be included in a group notification message that notifies the UE 1 of information about the MCPTT group of which it is a member. Regardless, the method in one or more embodiments may further include receiving an MBMS subchannel control message, e.g., on an MBMS subchannel protected by a key accessible to any UE that is a member of at least one MCPTT group whose MBMS subchannel control messages are sent on the MBMS subchannel (Block 130). In this case, the method may further include the UE 1 determining whether the MBMS subchannel control message is for the MCPTT group of which the UE 1 is a member, by determining whether the MBMS subchannel control message includes the MCPTT group pseudonym 7 for the MCPTT group identity 11 that identifies the MCPTT group (Block 140).

FIG. 1D shows a method performed by MCPTT server 5 according to other embodiments for concealment of an MCPTT group identity 11. The method as shown includes sending from the MCPTT server 5 to the UE 1 an indication of the MCPTT group pseudonym 7, e.g., which is a pseudonym for an MCPTT group identity 11 that identifies an MCPTT group of which the UE 1 is a member (Block 160). In some embodiments, the indication 9 may be sent during a call setup procedure, e.g., in a group call response to the UE 1. Regardless, at least in embodiments where the indication 9 comprises the MCPTT group pseudonym itself, the method may further include the MCPTT server 5 obtaining (e.g., receiving or generating) the MCPTT group pseudonym 7 for the MCPTT group identity 11 (Block 150). The MCPTT server 5 may for instance randomly generate the the MCPTT group pseudonym 7, e.g., to look like a random string.

FIG. 1E shows a corresponding method performed by UE 1 according to other embodiments for concealment of an MCPTT group identity 11. The method as shown includes receiving from the MCPTT server 5 an indication of the MCPTT group pseudonym 7, e.g., which is a pseudonym for an MCPTT group identity 11 that identifies an MCPTT group of which the UE 1 is a member (Block 170). In some embodiments, the indication 9 may be received during a call setup procedure, e.g., in a group call response to the UE 1. Regardless, the method in one or more embodiments may further include receiving an MBMS subchannel control message, e.g., on an MBMS subchannel protected by a key accessible to any UE that is a member of at least one MCPTT group whose MBMS subchannel control messages are sent on the MBMS subchannel (Block 180). In this case, the method may further include the UE 1 determining whether the MBMS subchannel control message is for the MCPTT group of which the UE 1 is a member, by determining whether the MBMS subchannel control message includes the MCPTT group pseudonym 7 for the MCPTT group identity 11 that identifies the MCPTT group (Block 190).

One or more embodiments will now be described in the specific context where the control signalling 6 constitutes MBMS subchannel control messages. MBMS subchannel control messages can contain sensitive information such as the MCPTT Group identity (ID). In technical specification (TS 33.179) of 3rd Generation Partnership Project (3GPP), MCPTT Group IDs are classified as sensitive information to which confidentiality protection may be applied (clause 9.3.2). In this particular case, an unauthorized user equipment (UE) within the service area of an active MBMS bearer can listen on the general purpose subchannel and gain knowledge about the presence (e.g., in high or low number of agents belonging to) a particular public organization (e.g. police). Such real time knowledge can be exploited for criminal activities.

A skillful attacker with radio capabilities (e.g. fake evolved nodeB (eNB)) can construct and broadcast fake MBMS subchannel control messages in order to deceive MCPTT clients, causing them for example to start receiving and rendering the media and floor control messages via the MBMS bearer while no data is actually being distributed. The attacker most likely won't be able to make MCPTT clients blindly switch to MBMS bearers thus disrupting the ongoing session in what could be considered as a denial of service attack. In fact, depending on the implementation, during the transition and while attempting to synchronize, the MCPTT client would probably detect that there is no or fake data on the MBMS bearer. Nevertheless, the MCPTT UE has to go to the extent of allocating and using some of the radio and processing resources before detecting that the messages are fake.

Therefore, confidentiality and integrity protection of MBMS subchannel control messages is needed. Different security mechanisms may be summarized as follows. First, since the MBMS subchannel control messages are encoded as Real-time Transport Protocol (RTP) control protocol (RTCP) packets, what is actually needed are procedures for the generation and distribution of parameters that could be used in the generation of Secure RTCP (SRTCP) master key and SRTCP master salt.

The keys already specified in the MCPTT security solution are described in clause 7.3.3 of TS 33.179. Reuse of Multicast Floor Control Key (MKFC) presents a mechanism where one of the existing keys is reused for the protection of the MBMS subchannel control messages. The other keys are either user-specific and hence cannot be used for protection of broadcast data (Private Call Key (PCK), Client Server Key (CSK)); or they have completely a different purpose and are used on different communication channels (Group Master Key (GMK), Signalling Protection Key (SPK)). The remaining alternatives introduce new keys.

Reuse of MKFC

This mechanism is based on using the MKFC as the protection key. This is because the currently specified MBMS subchannel control messages are group specific. In fact, each message heretofore includes one (and only one) MCPTT Group ID. Therefore, if a message containing a particular group ID is protected by the MKFC of that group, then only the members of the group would be able to decipher and check the integrity of the message. On the upside, there is not much needed on the key management side since there are already procedures for the generation and distribution of the MKFC to group members. On the downside, using this key for another purpose goes against the best practices and requires care in order to achieve cryptographic separation. Furthermore, the mechanism is not future proof. For example, it would not support new types of messages that are not group specific.

Use of a New MBMS Bearer Specific Key

This mechanism is based on the introduction of a new key: the MBMS subchannel control key (MSCCK). Upon the activation of an MBMS bearer, the MCPTT server generates an MSCCK and distributes it to the MCPTT clients. The key could be for example included in the bearer announcement message described in clause 10.10 of TS 23.179.

Use of a New Participating Function Key

This mechanism is based on the introduction of two new keys. The Participating Function Key (PFK) is a high level key used for the derivation of bearer specific MBMS subchannel control keys (MSCCK). The name of the PFK key is related to the participating MCPTT function, a function in the MCPTT server from which the MBMS subchannel control messages originate. New procedures are required for the distribution and management of the PFK. The PFK could be provisioned along with other key material such as the CSK. Upon the activation of an MBMS bearer, the MCPTT server derives the MSCCK for example using bearer specific information such as the Temporary Mobile Group Identity (TMGI). On the receiver side, the MCPTT client derives the MSCCK using the same bearer specific information provided in the bearer announcement message.

The problem solved by some embodiments herein relates to the two last alternatives and is as follows. Any UE within the service area of an active MBMS bearer in possession of the MSCCK (or PFK) has access to the information provided on the general purpose MBMS subchannel. The UE can therefore gain knowledge on which groups are active within the same service area. This could be problematic in cases such as "police investigating the police" and where it is beneficial and crucial to hide group related activities from non-member UEs. If the MCPTT Group ID is not changed or not bound to a particular group call session, then any other UE within the service area of a bearer who is in possession of the general purpose protection key (as in alternatives Use of a new MBMS bearer specific key, and Use of a new participating function key) can learn about ongoing sessions for any groups, even for groups where the UE doesn't belong.

A mechanism for hiding the MCPTT Group ID transported in the MBMS subchannel control messages is presented, such that only the group members can determine whether a message is related to their group or not. Consequently, any UE within the service area of an active MBMS bearer, in possession of the general purpose protection key, cannot identify which groups are currently active in the same area besides his own groups (i.e. groups where he is already a member).

The presented mechanism solves the problem raised above by using another identifier, call it a pseudonym or an alias, instead of the MCPTT Group ID in the MBMS subchannel control message. In some embodiments, such as where the pseudonym or alias has the same format as the MCPTT Group ID but different content (e.g., both the pseudonym and MCPTT Group ID are URIs), the pseudonym may be inserted into an MCPTT Group ID field of an MBMS subchannel control message instead of the actual MCPTT Group ID. In other embodiments, the MBMS subchannel control message may include an actual MCPTT Group Pseudonym field instead of an MCPTT Group ID field. In either case, though, such alias is only to be disclosed to the MCPTT clients participating in the call session. In another option, the alias is only disclosed to the group members. The presented mechanism guarantees that only the participating clients, or the group members depending on the option, knowing the alias can understand the MBMS subchannel control messages as being directed to a certain MCPTT group and act accordingly on it. The presented mechanism guarantees that the aliases are unlinkable (untrackable) to back the original MCPTT Group ID by UEs which are not the participating clients, or are not the group members depending on the option. Some embodiments herein correspondingly provide distribution and generation mechanisms for the aliases, e.g., that do not incur a considerable overhead.

Broadly, then, some embodiments propose use of an alternative to the MCPTT Group ID in the MBMS subchannel control messages. This alternative is henceforth referred to as a pseudonym or alias. The link between an MCPTT Group ID and the corresponding alias is only known to the MCPTT group members or to MCPTT clients participating in the call session. The alias should not reveal the MCPTT Group ID it corresponds to and should in the best case look like a random string.

Embodiment 1: Group Specific MCPTT Group Aliases

Figure 2:
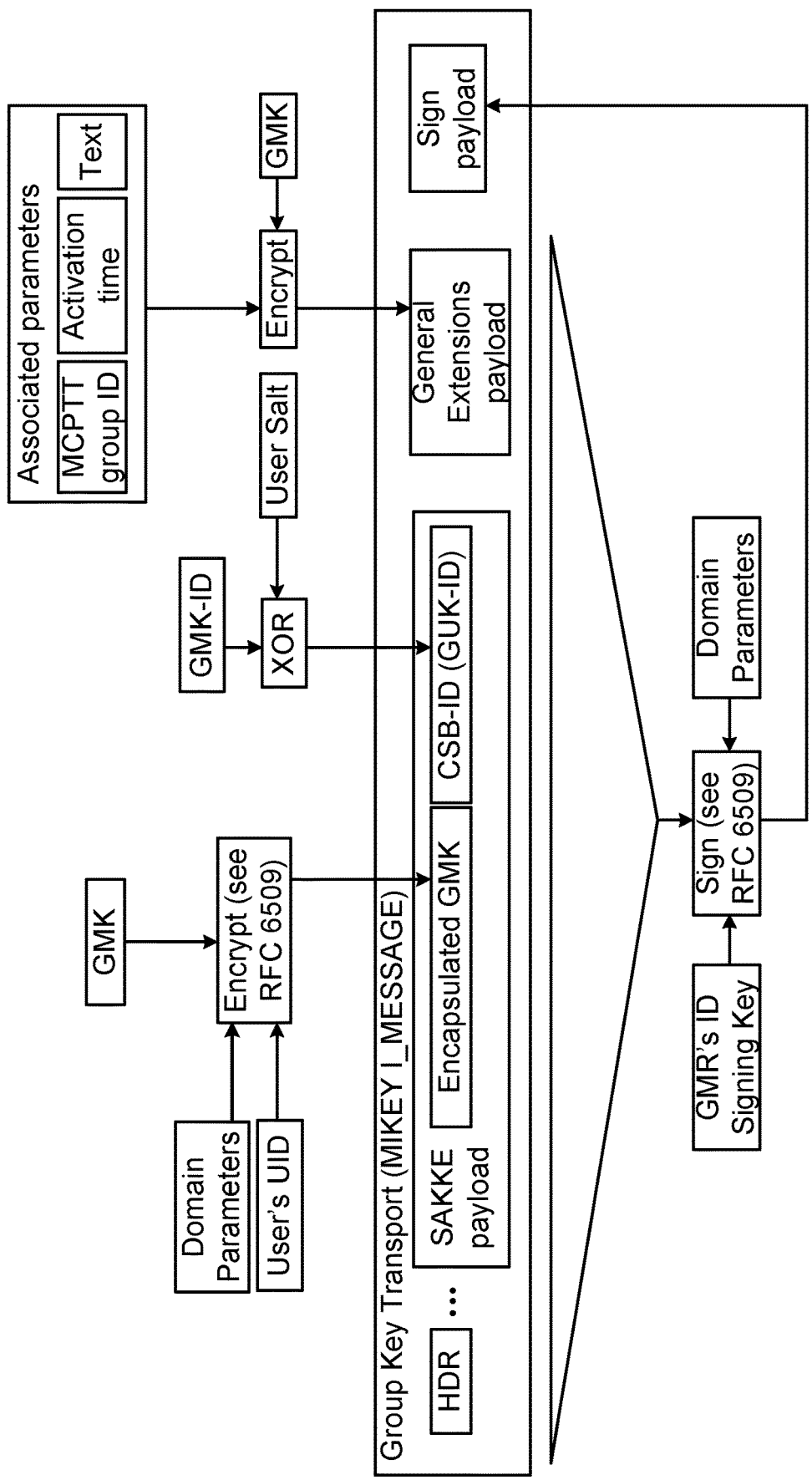
FIG. 2 is a schematic diagram illustrating a payload structure for GMK distribution.

In some embodiments, the aliases are group specific such that for each group an alias is provided or generated based on information provided during the provisioning of the GMK. For each group, the Group Management Server (GMS) constructs a MIKEY-SAKKE I_MESSAGE, as defined in Internet Engineering Task Force (IETF) Request for Comments (RFC) 6509 containing the necessary information as described in TS 33.179 clause 7.3.1. FIG. 2 shows the structure of such a payload with an indication on where the alias could be included. In particular, the aliases as shown may be added as an associated parameter, and will thus be encrypted into the general extension payload. FIG. 2 in this regard shows that in embodiments where the alias is defined as a function of the MCPTT Group ID and the GMK, the general extension payload indicates the alias by including those parameters MCPTT Group ID and GMK. In other embodiments not shown in FIG. 2, where the alias may be generated (e.g., randomly) by the GMS and sent to the UE, the alias itself may be indicated by an additional parameter in the "associated parameters" shown in FIG. 2.

The alias is generated along with other key material by the GMS. The alias could be generated randomly or for example based on a key derivation function (e.g. a hash function) using for example a known information (e.g. the MCPTT group ID) and a group specific secret parameter (e.g. the GMK). If the alias is generated based on information provided in the payload of FIG. 1A then there is no need to include the alias itself in the payload.

Figure 3:
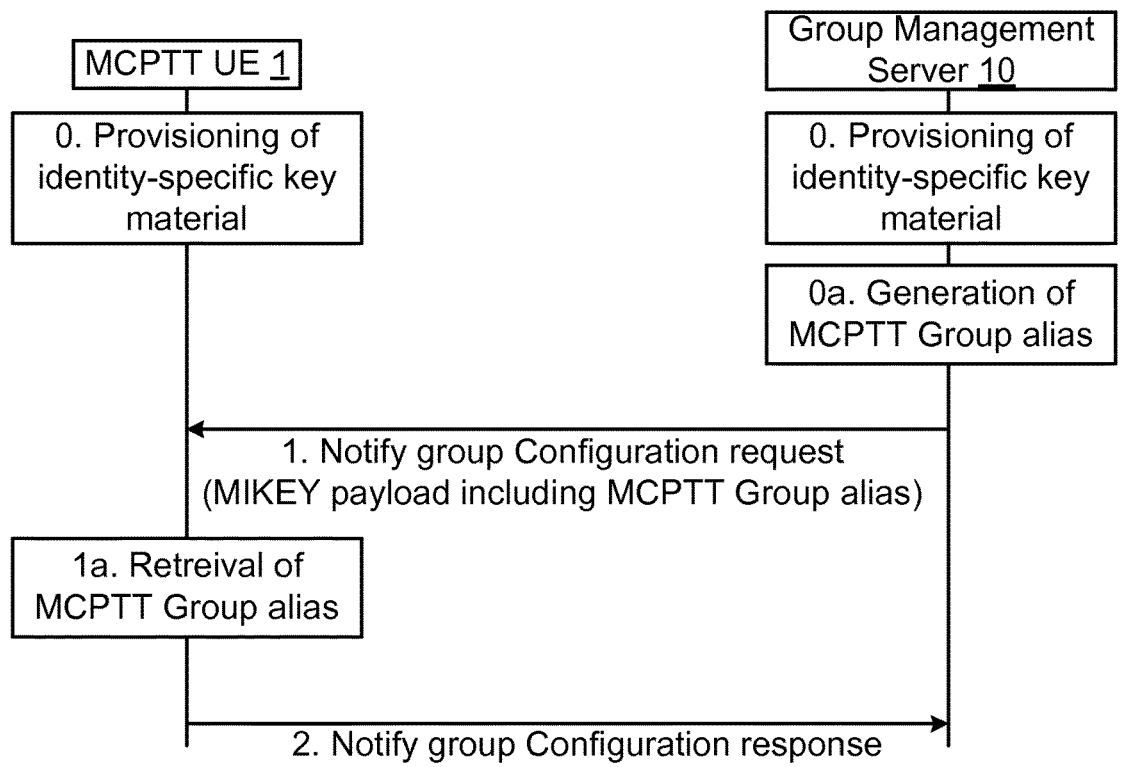
FIG. 3 is a schematic diagram illustrating alias provisioning along GMK.

The payload in some embodiments is then distributed to the MCPTT UEs (members of the group) in a group notification message as described in TS 33.179 clause 7.3.2. FIG. 3 illustrates a scenario where the alias is provided in the payload. Indeed, after provisioning of identity-specific key material in Step 0, the GMS 10 may generate the MCPTT group alias itself in Step 0a and send a Notify group Configuration request to the UE 1 with a MIKEY payload that includes the generated MCPTT Group alias. The UE 1 correspondingly retrieves the MCPTT Group alias from the request in Step 1 and may send a Notify Group configuration response back to the GMS 10.

Figure 4:
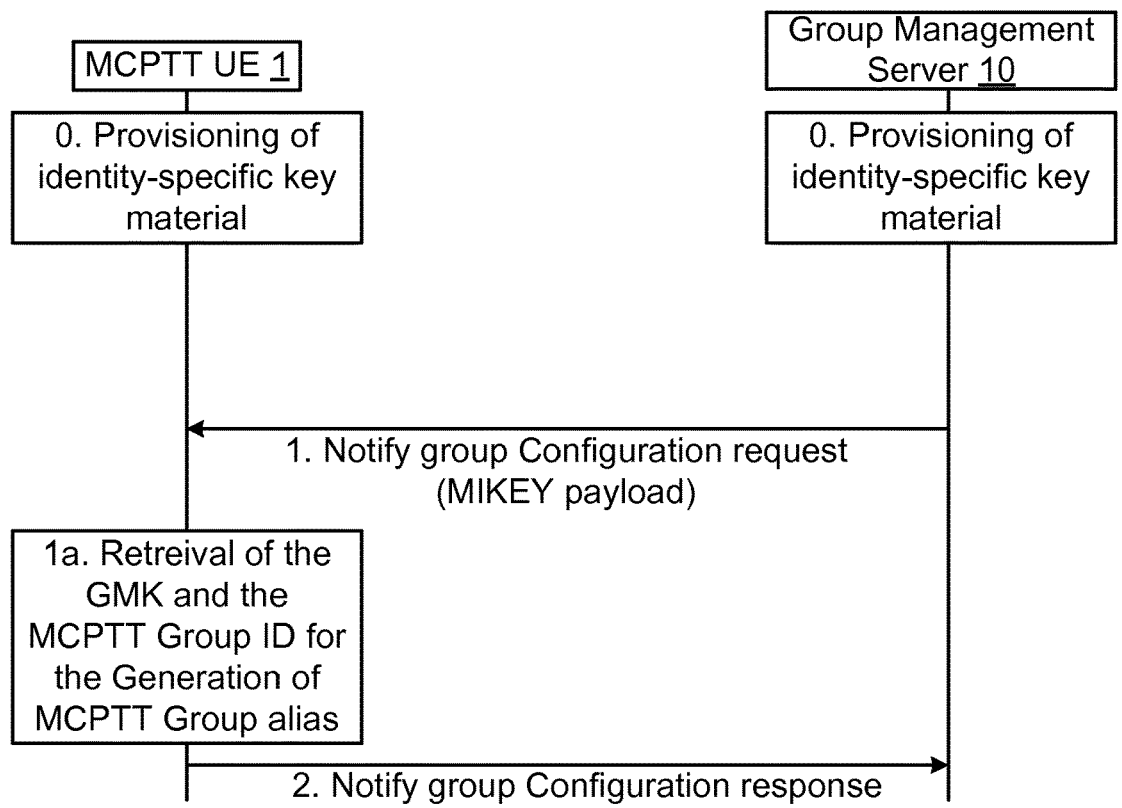
FIG. 4 is a schematic diagram illustrating generation of alias based on information provided in a GMK payload.

FIG. 4 illustrates an alternative scenario where the alias is generated based on the GMK and the MCPTT group ID provided in the payload. Rather than generating the actual MCPTT group alias after provisioning of identity-specific key material (step 0), the GMS 10 sends the Notify Group Configuration request with a MIKEY payload that includes certain parameters; namely, the GMK and MCPTT Group ID, rather than the actual MCPTT Group alias. The UE 1 therefore retrieves the GMK and MCPTT Group ID from the request and generates the MCPTT Group alias from those parameters. The UE 1 may similarly send back a notify group configuration response in Step 2.

Alternatively, the alias (or the parameters used for the alias generation) may in some embodiments be distributed to the MCPTT clients in other types of messages with for example XML content. In such case, the alias may be protected using the client server key (CSK)/signalling protection key (SPK) as described in TS 33.179 clause 9.3.

Embodiment 2: Call Session Specific MCPTT Group Aliases

Figure 5:
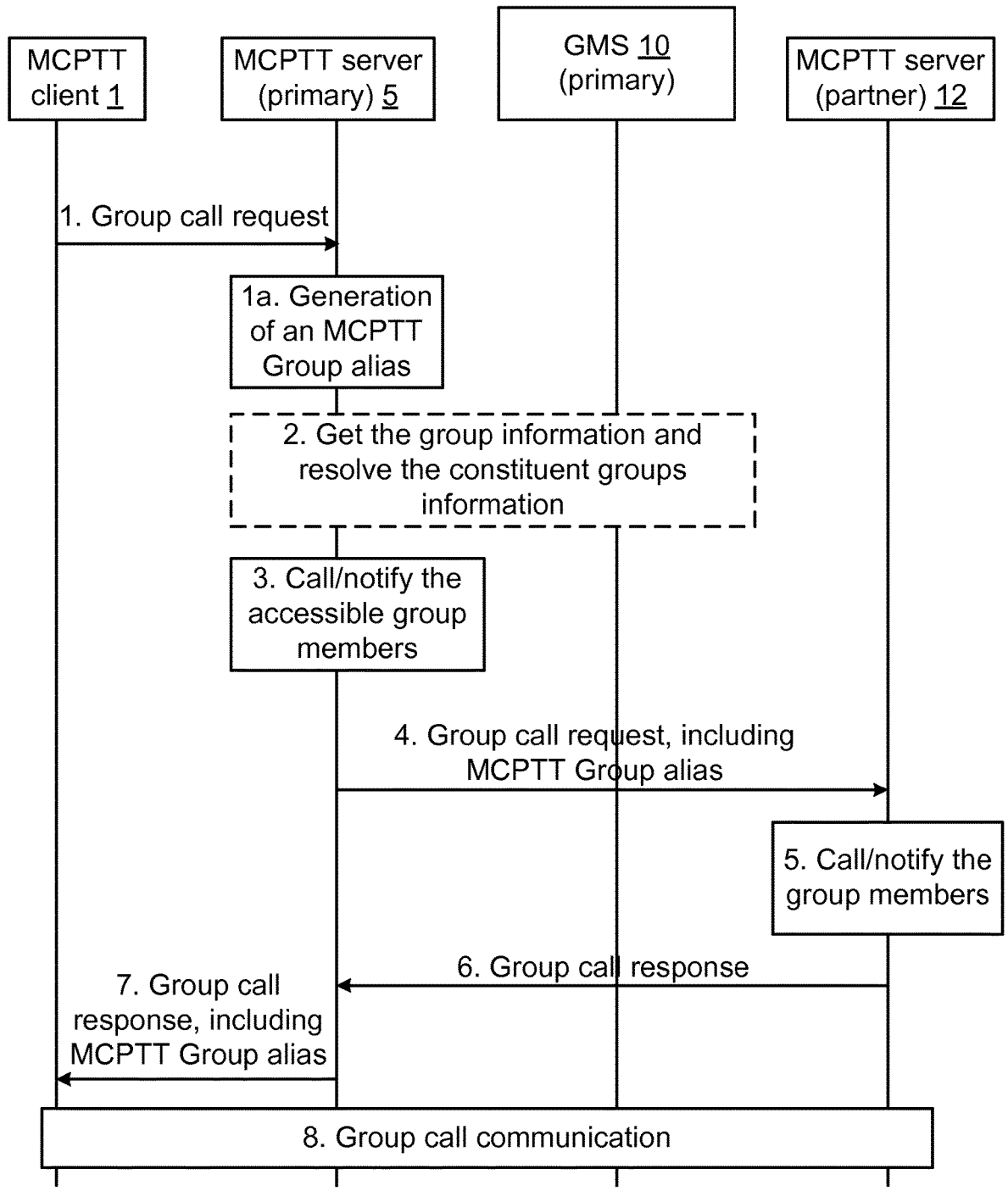
FIG. 5 is a schematic diagram illustrating generation and distribution of an MCPTT group alias on an originating side.
Figure 6:
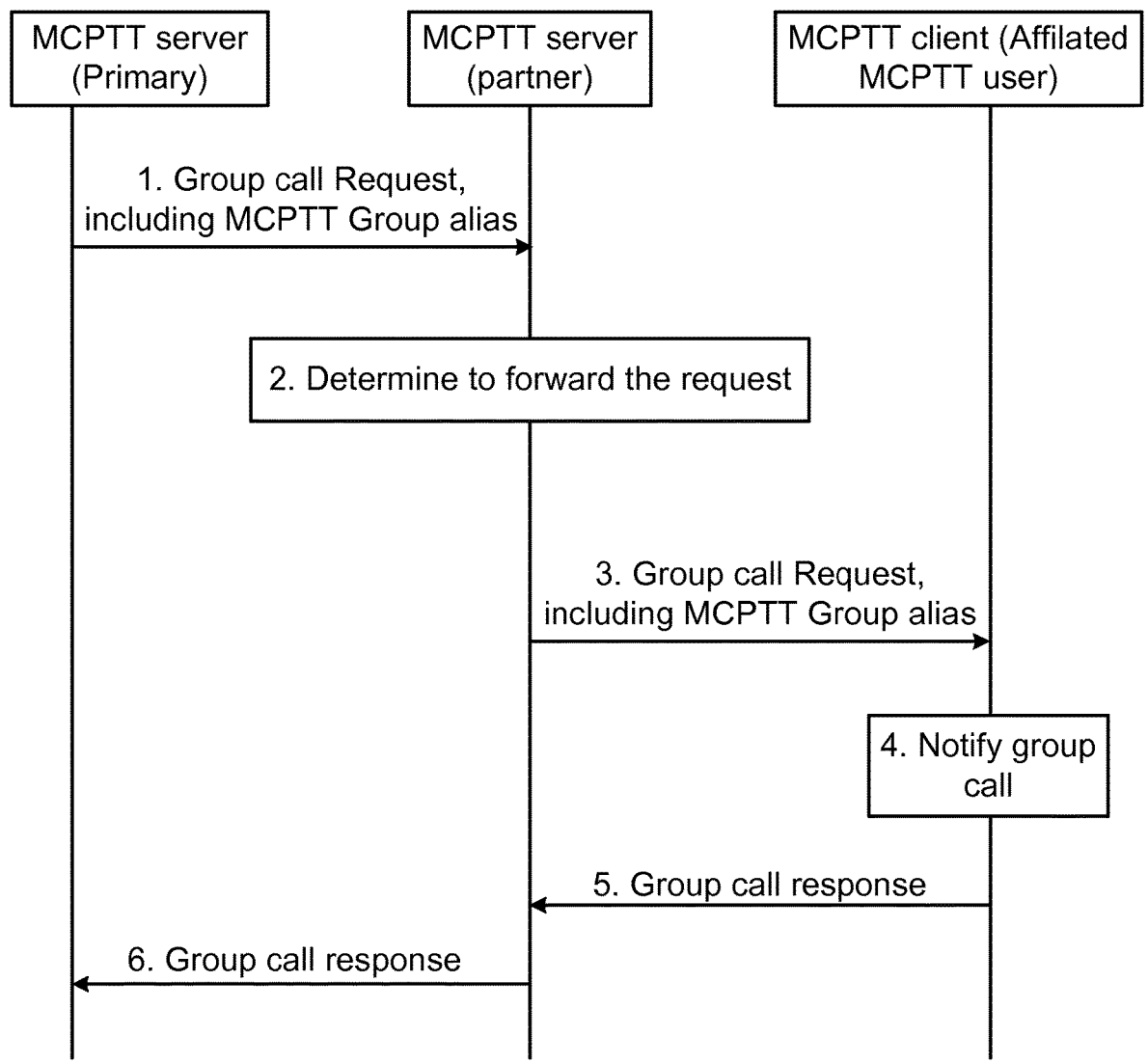
FIG. 6 is a schematic diagram illustrating distribution of the MCPTT group alias on a terminating side.

The aliases in some embodiments are call session specific such that for each call an alias is provided or generated based on information provided during the call setup procedures, e.g., described in TS 23.179 clause 10.6.2.4.1.1. Consider the following example embodiments shown in FIGS. 5 and 6 which illustrate steps in the call setup procedures for generating and distributing an alias. As shown in FIG. 5, upon the reception of a group call request (Step 1), the MCPTT server 5 in some embodiments generates an MCPTT Group alias (Step 1a) and distributes it to the active group members and the initiating MCPTT client. In particular, the MCPTT server 5 gets the information about the group associated with the group call request, and resolves the constituent groups information (Optional Step 2). This means that the MCPTT server obtains information about members of the MCPTT group from GMS. The MCPTT server 5 calls/notifies the accessible group members (Step 3). In step 4, the primary MCPTT server 5 sends a group call request to the partner MCPTT server 12, wherein the group call request includes the MCPTT group alias. This provides the group alias to partner MCPTT servers as well so that the group alias gets possibly distributed to the MCPTT clients of the affiliated MCPTT users (Step 5). This is not necessary, and in an alternative the MCPTT group alias is not sent to the partner MCPTT server. Hence, in FIG. 6 under this alternative the group call request in steps 1 and 3 would not include the MCPTT group alias. After receiving the group call response (Step 6), the MCPTT server 5 sends the group call response to the MCPTT client 1, which includes the MCPTT group alias (Step 7). Group call communication (Step 8) may then proceed using the MCPTT group alias instead of the MCPTT group identity.

Note that, depending on how the aliases are generated, steps 1a and 2 of FIG. 5 may possibly occur in any order.s

Embodiment 3: Encryption of the MCPTT Group ID Information Element

One other protection mechanism in some embodiments is to encrypt the MCPTT Group ID information element in the MBMS channel control message. The encryption may be made using one of the group keys that the MCPTT client, i.e. members of the group in question, already have access to. This may be the GMK or the MKFC.

In embodiments where the MKFC is used, the MCPTT server proceeds as follows. If the MCPTT server decides to send an MBMS subchannel control message to members of s group X, it encrypts the MCPTT Group ID of group X with the MKFC of group X and includes the cipher text in the information element reserved for the MCPTT Group ID in the control message. It is assumed here that the encryption scheme may include in the cipher text an indication of which key was used (e.g. the key identifier)

On the MCPTT client side, only the clients that are members in group X are in possession of the MKFC of group X. Therefore, they are the only one able to decipher the encrypt text and retrieve the MCPTT Group ID of group X. Now, when an MCPTT client receives an MBMS subchannel control message, it checks that it has the key indicated bsy the key identifier in the encrypted part. If it has the required key, it deciphers the information element and acts on the control message accordingly otherwise it simply discards the message.

Figure 7A:
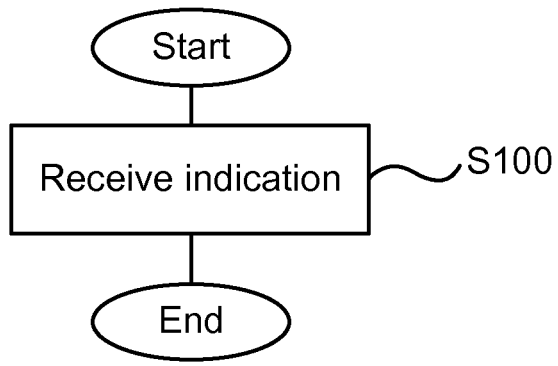
FIGS. 7A-7C are flowcharts illustrating methods for embodiments presented herein.
Figure 7B:
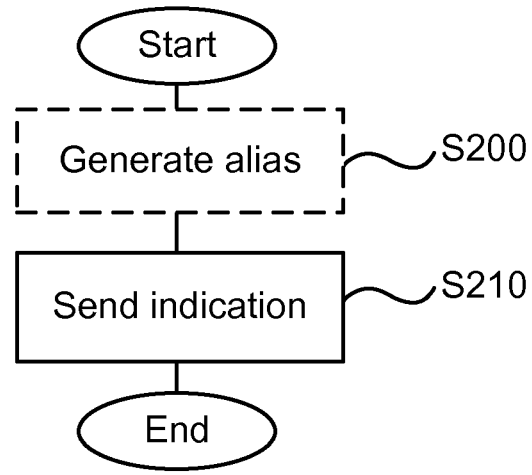
Figure 7C:
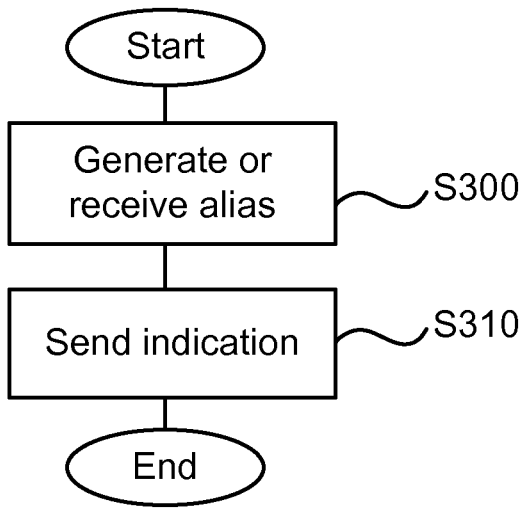

FIGS. 7A-7C illustrate methods according to still other embodiments. In particular, a method, according to an embodiment, for concealment of a MCPTT group identifier in a MBMS is presented with reference to FIG. 7A. The method is performed in a UE 1 and comprises receiving S100 an indication of a MCPTT group alias from a GMS, which MCPTT group alias is used instead of a MCPTT group identity in MCPTT group call communication.

The indication of a MCPTT group alias may be received in a group notification message. The group notification message may for instance contain a MIKEY-SAKKE I_MESSAGE including the indication of the MCPTT group pseudonym. The indication in this case may be included in a general extension payload of the MIKEY-SAKKE I_MESSAGE of the group notification message. Alternatively, the MCPTT group alias may be generated from a GMK and the MCPTT group identity retrieved from the message.

The MCPTT group alias may be generated randomly.

The indication of a MCPTT group alias may be received in a CSK/SPK encrypted message. The MCPTT group alias may be retrieved from the message. Alternatively, the MCPTT group alias may be generated from parameters retrieved from the message.

A method, according to an embodiment, for concealment of a MCPTT group identifier in a MBMS is presented with reference to FIG. 7B. The method is performed in a GMS 10 and comprises sending S210 an indication of a MCPTT group alias to a UE, which MCPTT group alias is used instead of a MCPTT group identity in MCPTT group call communication.

The indication of a MCPTT group alias may be sent in a MIKEY-SAKKE I_MESSAGE. The method may further comprise generating S200 the MCPTT group alias, and wherein the MCPTT group alias may be added to a general extension payload of the message.

The MCPTT group alias may be generated randomly.

The indication of a MCPTT group alias may be sent in a CSK/SPK encrypted message. The method may further comprise generating S200 the MCPTT group alias, and wherein MCPTT group alias may be added to the message. Parameters for generation of the MCPTT group alias may alternatively be added to the message.

A method, according to an embodiment, for concealment of a MCPTT group identifier in a MBMS is presented with reference to FIG. 7A. The method is performed in a UE and comprises receiving S100 an indication of a MCPTT group alias from a MCPTT server, which MCPTT group alias is used instead of a MCPTT group identity in MCPTT group call communication.

A method, according to an embodiment, for concealment of a MCPTT group identifier in a MBMS is presented with reference to FIG. 7C. The method is performed in a MCPTT server 5 and comprises generating or receiving S300 a MCPTT group alias and sending S310 an indication of the MCPTT group alias to a UE, which MCPTT group alias is used instead of a MCPTT group identity in MCPTT group call communication.

Note that a UE 1 may perform the method in FIG. 1C, FIG. 1E, or FIG. 7A or any other processing herein by implementing any functional means or units. In one embodiment, for example, the UE 1 comprises respective circuits or circuitry configured to perform the steps shown in FIG. 1C, 1E, and/or 7A. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores instructions that, when executed by the UE's processing circuitry, causes the UE to perform the processing herein, e.g., receive an indication of the MCPTT group pseudonym 7 (from the GMS 10 or MCPTT server 5).

For example, a UE 1, according to an embodiment, for concealment of a MCPTT group identifier in a MBMS is presented with reference to FIG. 8. The UE 1 comprises processor 16 and a computer program product 12, 13. The computer program product stores instruction that, when executed by the processor, causes the UE to receive an indication of a MCPTT group alias from a GMS, which MCPTT group alias is used instead of a MCPTT group identity in MCPTT group call communication.

As another example, a UE, according to a different embodiment, for concealment of a MCPTT group identifier in a MBMS is presented with reference to FIG. 8. The UE 1 comprises a processor 16 and a computer program product 12, 13. The computer program product stores instruction that, when executed by the processor, causes the UE to receive an indication of a MCPTT group alias from a MCPTT server, which MCPTT group alias is used instead of a MCPTT group identity in MCPTT group call communication.

Note that a GMS 10 may perform the method in FIG. 1B or FIG. 7B or any other processing herein by implementing any functional means or units. In one embodiment, for example, the GMS 10 comprises respective circuits or circuitry configured to perform the steps shown in FIG. 1B or 7B. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores instructions that, when executed by the GMS's processing circuitry, causes the GMS 10 to perform the processing herein, e.g., send to the UE 1 an indication of the MCPTT group pseudonym 7.

For example, a GMS, according to an embodiment, for concealment of a MCPTT group identifier in a MBMS is presented with reference to FIG. 9. The GMS 10 comprises a processor 20 and a computer program product 22, 23. The computer program product stores instruction that, when executed by the processor, causes the GMS to send an indication of a MCPTT group alias to a UE, which MCPTT group alias is used instead of a MCPTT group identity in MCPTT group call communication.

Note further that an MCPTT server 5 may perform the method in FIG. 1D or FIG. 7C or any other processing herein by implementing any functional means or units. In one embodiment, for example, the MCPTT server 5 comprises respective circuits or circuitry configured to perform the steps shown in FIG. 1D or 7C. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores instructions that, when executed by the MCPTT server's processing circuitry, causes the MCPTT server 5 to perform the processing herein, e.g., send to the UE 1 an indication of the MCPTT group pseudonym 7.

For example, an MCPTT server, according to an embodiment, for concealment of a MCPTT group identifier in a MBMS is presented with reference to FIG. 9. The MCPTT server 5 comprises processor 20 and a computer program product 22, 23. The computer program product stores instructions that, when executed by the processor, causes the MCPTT server to generate or receive a MCPTT group alias and to send the MCPTT group alias to a UE, which MCPTT group alias is used instead of a MCPTT group identity in MCPTT group call communication.

In still other embodiments, a UE, for concealment of a MCPTT group identifier in a MBMS is presented with reference to FIG. 10. The UE 1 comprises a communication manager 91. The communication manager is for receiving an indication of a MCPTT group pseudonym or alias from a GMS 10. The MCPTT group pseudonym may for instance be a pseudonym for an MCPTT group identity that identifies an MCPTT group of which the UE 1 is a member. Alternatively or additionally, the MCPTT group alias may be used instead of a MCPTT group identity in MCPTT group call communication.

A GMS, according to an embodiment, for concealment of a MCPTT group identifier in a MBMS is presented with reference to FIG. 11. The GMS 10 comprises a communication manager 101. The communication manager is for sending an indication of a MCPTT group pseudonym or alias to a UE. The MCPTT group pseudonym may for instance be a pseudonym for an MCPTT group identity that identifies an MCPTT group of which the UE 1 is a member. Alternatively or additionally, the MCPTT group alias may be used instead of a MCPTT group identity in MCPTT group call communication.

A UE, according to an embodiment, for concealment of a MCPTT group identifier in a MBMS is presented with reference to FIG. 10. The UE 1 comprises a communication manager 91. The communication manager is for receiving an indication of a MCPTT group pseudonym or alias from a MCPTT server. The MCPTT group pseudonym may for instance be a pseudonym for an MCPTT group identity that identifies an MCPTT group of which the UE 1 is a member. Alternatively or additionally, the MCPTT group alias may be used instead of a MCPTT group identity in MCPTT group call communication.

A MCPTT server, according to an embodiment, for concealment of a MCPTT group identifier in a MBMS is presented with reference to FIG. 11. The MCPTT server 5 comprises a communication manager (101) for sending the MCPTT group pseudonym or alias to a UE. The MCPTT group pseudonym may for instance be a pseudonym for an MCPTT group identity that identifies an MCPTT group of which the UE 1 is a member. Alternatively or additionally, the MCPTT group alias may be used instead of a MCPTT group identity in MCPTT group call communication. The MCPTT server 5 as shown may also include a determination manager 100. The determination manager 100 may be for generating or receiving the MCPTT group pseudonym or alias.

A computer program 14, 15, according to an embodiment, for concealment of a MCPTT group identifier in a MBMS is presented with reference to FIG. 8. The computer program comprises computer program code which, when run on a UE, causes the UE 1 to receive S100 an indication of a MCPTT group pseudonym or alias from a GMS. The MCPTT group pseudonym may for instance be a pseudonym for an MCPTT group identity that identifies an MCPTT group of which the UE 1 is a member. Alternatively or additionally, the MCPTT group alias may be used instead of a MCPTT group identity in MCPTT group call communication.

A computer program 24, 25, according to an embodiment, for concealment of a MCPTT group identifier in a MBMS is presented with reference to FIG. 9. The computer program comprises computer program code which, when run on a GMS, causes the GMS 10 to send S210 an indication of a MCPTT group pseudonym or alias to a UE. The MCPTT group pseudonym may for instance be a pseudonym for an MCPTT group identity that identifies an MCPTT group of which the UE 1 is a member. Alternatively or additionally, the MCPTT group alias may be used instead of a MCPTT group identity in MCPTT group call communication.

A computer program 14, 15, according to an embodiment, for concealment of a MCPTT group identifier in a MBMS is presented with reference to FIG. 8. The computer program comprises computer program code which, when run on a UE, causes the UE 1 to receive S100 an indication of a MCPTT group pseudonym or alias from a MCPTT server. The MCPTT group pseudonym may for instance be a pseudonym for an MCPTT group identity that identifies an MCPTT group of which the UE 1 is a member. Alternatively or additionally, the MCPTT group alias may be used instead of a MCPTT group identity in MCPTT group call communication.

A computer program 24, 25, according to an embodiment, for concealment of a MCPTT group identifier in a MBMS is presented with reference to FIG. 9. The computer program comprises computer program code which, when run on a MCPTT server, causes the MCPTT server 5 to send S310 an indication of an MCPTT group pseudonym or alias to a UE. The MCPTT group pseudonym may for instance be a pseudonym for an MCPTT group identity that identifies an MCPTT group of which the UE 1 is a member. Alternatively or additionally, the MCPTT group alias may be used instead of a MCPTT group identity in MCPTT group call communication. The code may also in some embodiments cause the MCPTT server 5 to generate or receive S300 the MCPTT group pseudonym or alias.

A computer program product 12, 13 (FIG. 8), 22, 23 (FIG. 9) comprising a computer program 14, 15, (FIG. 8), 24, 25 (FIG. 9) and a computer readable storage means on which the computer program 14, 15, 24, 25 is stored, is also presented.

FIG. 8 is a schematic diagram showing some components of the UE 1. The processor 16 may be provided using any combination of one or more of a suitable central processing unit, CPU, multiprocessor, microcontroller, digital signal processor, DSP, application specific integrated circuit etc., capable of executing software instructions of a computer program 14 stored in a memory. The memory can thus be considered to be or form part of the computer program product 12. The processor 16 may be configured to execute methods described herein with reference to FIG. 7A.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processor 16. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the UE 1.

The UE 1 may further comprise an input/output (I/O) interface 17 including e.g. a user interface. The UE 1 may further comprise a receiver configured to receive signalling from other nodes, and a transmitter configured to transmit signalling to other nodes (not illustrated). Other components of the UE 1 are omitted in order not to obscure the concepts presented herein.

FIG. 10 is a schematic diagram showing functional blocks of the UE 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 7A, comprising a determination manager unit 90 and a communication manager unit 91. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manager 90 is for enabling concealment of a MCPTT group identifier in a MBMS. This module corresponds to the generation of MCPTT group alias illustrated in FIG. 4. This module can e.g. be implemented by the processor 16 of FIG. 10, when running the computer program.

The communication manager 91 is for concealment of a MCPTT group identifier in a MBMS. This module corresponds to the receive step S100 of FIG. 7A. This module can e.g. be implemented by the processor 16 of FIG. 10, when running the computer program.

FIG. 9 is a schematic diagram showing some components of the GMS 10 and the MCPTT server 5. A processor 20 may be provided using any combination of one or more of a suitable central processing unit, CPU, multiprocessor, microcontroller, digital signal processor, DSP, application specific integrated circuit etc., capable of executing software instructions of a computer program 24 stored in a memory. The memory can thus be considered to be or form part of the computer program product 22. The processor 20 may be configured to execute methods described herein with reference to FIGS. 7B and 7C.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 23 in the form of a data memory may also be provided, e.g. for reading and/or storing data during execution of software instructions in the processor 20. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 25, to improve functionality for the GMS 10 or the MCPTT server 5.

The GMS 10 and the MCPTT server 5 may further comprise an input/output, I/O, interface 21 including e.g. a user interface. The GMS 10 and the MCPTT server 5 may further comprise a receiver configured to receive signalling from other nodes, and a transmitter configured to transmit signalling to other nodes (not illustrated). Other components of the GMS 10 or the MCPTT server 5 are omitted in order not to obscure the concepts presented herein.

FIG. 11 is a schematic diagram showing functional blocks of the GMS 10 and the MCPTT server 5. The modules may be implemented as only software instructions such as a computer program executing in the cache server or only hardware, such as application-specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIGS. 7B and 7C, comprising a determination manager unit 100 and communication manager unit 101. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manager 100 is for enabling concealment of a MCPTT group identifier in a MBMS. This module corresponds to the generate step S200 of FIG. 7B and the generate or receive step S300 of FIG. 7C. This module can e.g. be implemented by the processor 20 of FIG. 9, when running the computer program.

The communication manager 101 is for enabling concealment of a MCPTT group identifier in a MBMS. This module corresponds to the send step S210 of FIG. 7B and the send step S310 of FIG. 7C. This module can e.g. be implemented by the processor 20 of FIG. 9, when running the computer program.

Accordingly, various aspects herein are disclosed. According to a first aspect there is presented a method for concealment a MCPTT group identifier in a MBMS. The method is performed by a user equipment (UE), and comprises receiving an indication of a MCPTT group alias from a group management server (GMS), which MCPTT group alias is used instead of a MCPTT group identity in MCPTT group call communication.

The indication of a MCPTT group alias may be received in a group notification message. The group notification message may for instance contain a MIKEY-SAKKE I_MESSAGE including the indication of the MCPTT group pseudonym. The indication in this case may be included in a general extension payload of the MIKEY-SAKKE I_MESSAGE of the group notification message. The MCPTT group alias may be generated from a GMK and the MCPTT group identity retrieved from the message.

The MCPTT group alias may be generated randomly.

The indication of a MCPTT group alias may be received in a client server key (CSK)/signalling protection key (SPK) encrypted message.

The MCPTT group alias may be retrieved from the message.

The MCPTT group alias may be generated from parameters retrieved from the message.

According to a second aspect there is presented a method for concealment of a mission-critical push-to-talk (MCPTT) group identifier in a multimedia broadcast multicast services (MBMS). The method is performed in a group management server (GMS) and comprises sending an indication of a MCPTT group alias to a user equipment (UE), which MCPTT group alias is used instead of a MCPTT group identity in MCPTT group call communication.

The indication of a MCPTT group alias may be sent in a MIKEY-SAKKE I_MESSAGE.

The method may further comprise generating the MCPTT group alias, and wherein the MCPTT group alias is added to a general extension payload of the message.

The MCPTT group alias may be generated randomly.

The indication of a MCPTT group alias may be sent in a client server key (CSK)/signalling protection key (SPK) encrypted message.

The method may further comprise generating the MCPTT group alias, and wherein MCPTT group alias is added to the message.

Parameters for generation of the MCPTT group alias may be added to the message.

According to third aspect there is presented a method for concealment of a mission-critical push-to-talk (MCPTT) group identifier in a multimedia broadcast multicast services (MBMS). The method is performed in a user equipment (UE) and comprises receiving an indication of a MCPTT group alias from a MCPTT server, which MCPTT group alias is used instead of a MCPTT group identity in MCPTT group call communication.

According to a fourth aspect there is presented a method for concealment of a mission-critical push-to-talk (MCPTT) group identifier in a multimedia broadcast multicast services (MBMS). The method being is in a MCPTT server and comprises generating or receiving a MCPTT group alias, and sending the MCPTT group alias to a user equipment (UE), which MCPTT group alias is used instead of a MCPTT group identity in MCPTT group call communication.

According to a fifth aspect there is presented a user equipment (UE) for concealment of a mission-critical push-to-talk (MCPTT) group identifier in a multimedia broadcast multicast services (MBMS). The UE comprises a processor and a computer program product. The computer program product stores instruction that, when executed by the processor, causes the UE to receive an indication of a MCPTT group alias from a group management server (GMS), which MCPTT group alias is used instead of a MCPTT group identity in MCPTT group call communication.

According to a sixth aspect there is presented a group management server (GMS) for concealment of a mission-critical push-to-talk (MCPTT) group identifier in a multimedia broadcast multicast services (MBMS). The GMS comprises a processor and a computer program product. The computer program product stores instruction that, when executed by the processor, causes the GMS to send an indication of a MCPTT group alias to a user equipment (UE), which MCPTT group alias is used instead of a MCPTT group identity in MCPTT group call communication.

According to a seventh aspect there is presented a user equipment (UE) for concealment of a mission-critical push-to-talk (MCPTT) group identifier in a multimedia broadcast multicast services (MBMS). The UE comprises a processor and a computer program product. The computer program product stores instruction that, when executed by the processor, causes the UE to receive an indication of a MCPTT group alias from a MCPTT server, which MCPTT group alias is used instead of a MCPTT group identity in MCPTT group call communication.

According to an eighth aspect there is presented a mission-critical push-to-talk (MCPTT) server for concealment of a MCPTT group identifier in a multimedia broadcast multicast services (MBMS). The MCPTT server comprises a processor and a computer program product. The computer program product stores instruction that, when executed by the processor, causes the MCPTT server to generate or receive a MCPTT group alias, and to send the MCPTT group alias to a user equipment (UE), which MCPTT group alias is used instead of a MCPTT group identity in MCPTT group call communication.

According to a ninth aspect there is presented a user equipment (UE) for concealment of a mission-critical push-to-talk (MCPTT) group identifier in a multimedia broadcast multicast services (MBMS). The UE comprises a communication manager for receiving an indication of a MCPTT group alias from a group management server (GMS), which MCPTT group alias is used instead of a MCPTT group identity in MCPTT group call communication.

According to a tenth aspect there is presented a group management server (GMS) for concealment of a mission-critical push-to-talk (MCPTT) group identifier in a multimedia broadcast multicast services (MBMS). The GMS comprises a communication manager for sending an indication of a MCPTT group alias to a user equipment (UE), which MCPTT group alias is used instead of a MCPTT group identity in MCPTT group call communication.

According to an eleventh aspect there is presented a user equipment (UE) for concealment of a mission-critical push-to-talk (MCPTT) group identifier in a multimedia broadcast multicast services (MBMS). The UE comprises a communication manager for receiving an indication of a MCPTT group alias from a MCPTT server, which MCPTT group alias is used instead of a MCPTT group identity in MCPTT group call communication.

According to a twelfth aspect there is presented a mission-critical push-to-talk (MCPTT) server for concealment of a MCPTT group identifier in a multimedia broadcast multicast services (MBMS). The MCPTT server comprises a determination manager and a communication manager. The determination manager is for generating or receiving a MCPTT group alias, and the communication manager is for sending the MCPTT group alias to a user equipment (UE), which MCPTT group alias is used instead of a MCPTT group identity in MCPTT group call communication.

According to a thirteenth aspect there is presented a computer program for concealment of a mission-critical push-to-talk (MCPTT) group identifier in a multimedia broadcast multicast services (MBMS). The computer program comprising computer program code which, when run on a user equipment (UE), causes the UE to receive an indication of a MCPTT group alias from a group management server (GMS), which MCPTT group alias is used instead of a MCPTT group identity in MCPTT group call communication.

According to a fourteenth aspect there is presented a computer program for concealment of a mission-critical push-to-talk (MCPTT) group identifier in a multimedia broadcast multicast services (MBMS). The computer program comprising computer program code which, when run on a group management server (GMS), causes the GMS to send an indication of a MCPTT group alias to a user equipment (UE), which MCPTT group alias is used instead of a MCPTT group identity in MCPTT group call communication.

According to a fifteenth aspect there is presented a computer program for concealment of a mission-critical push-to-talk (MCPTT) group identifier in a multimedia broadcast multicast services (MBMS). The computer program comprising computer program code which, when run on a user equipment (UE), causes the UE to receive an indication of a MCPTT group alias from a MCPTT server, which MCPTT group alias is used instead of a MCPTT group identity in MCPTT group call communication.

According to a sixteenth aspect there is presented a computer program for concealment of a mission-critical push-to-talk (MCPTT) group identifier in a multimedia broadcast multicast services (MBMS). The computer program comprising computer program code which, when run on a MCPTT server, causes the MCPTT server to generate or receive a MCPTT group alias, and to send the MCPTT group alias to a user equipment (UE), which MCPTT group alias is used instead of a MCPTT group identity in MCPTT group call communication.

According to a seventeenth aspect there is presented a computer program product comprising a computer program and a computer readable storage means on which the computer program is stored.

Accordingly, the following items may be enumerated as examples of some embodiments herein:

1. A method for concealment of a mission-critical push-to-talk (MCPTT) group identifier in a multimedia broadcast multicast services (MBMS), the method being performed in a user equipment (UE), and comprising receiving (S100) an indication of a MCPTT group alias from a group management server (GMS), which MCPTT group alias is used instead of a MCPTT group identity in MCPTT group call communication.

2. The method according to item 1, wherein the indication of a MCPTT group alias is received in a group notification message.
3. The method according to item 2, wherein the group notification message is a MIKEY-SAKKE I_MESSAGE.
4. The method according to item 3, wherein the MCPTT group alias is retrieved from a general extension payload of the message.
5. The method according to item 3, wherein the MCPTT group alias is generated from a GMK and the MCPTT group identity retrieved from the message.
6. The method according to any one of items 1 to 5, wherein the MCPTT group alias is generated randomly.
7. The method according to item 1, wherein the indication of a MCPTT group alias is received in a client server key (CSK)/signalling protection key (SPK) encrypted message.
8. The method according to item 7, wherein the MCPTT group alias is retrieved from the message.
9. The method according to item 7, wherein the MCPTT group alias is generated from parameters retrieved from the message.
10. A method for concealment of a mission-critical push-to-talk (MCPTT) group identifier in a multimedia broadcast multicast services (MBMS), the method being performed in a group management server (GMS), and comprising sending (S210) an indication of a MCPTT group alias to a user equipment (UE), which MCPTT group alias is used instead of a MCPTT group identity in MCPTT group call communication.
11. The method according to item 10, wherein the indication of a MCPTT group alias is sent in a MIKEY-SAKKE I_MESSAGE.
12. The method according to item 11, comprising generating (S200) the MCPTT group alias, and wherein the MCPTT group alias is added to a general extension payload of the message.
13. The method according to any one of items 10 to 12, wherein the MCPTT group alias is generated randomly.
14. The method according to item 10, wherein the indication of a MCPTT group alias is sent in a client server key (CSK)/signalling protection key (SPK) encrypted message.
15. The method according to item 14, comprising generating (S200) the MCPTT group alias, and wherein MCPTT group alias is added to the message.
16. The method according to item 14, wherein parameters for generation of the MCPTT group alias is added to the message.
17. A method for concealment of a mission-critical push-to-talk (MCPTT) group identifier in a multimedia broadcast multicast services (MBMS), the method being performed in a user equipment (UE), and comprising receiving (S100) an indication of a MCPTT group alias from a MCPTT server, which MCPTT group alias is used instead of a MCPTT group identity in MCPTT group call communication.
18. A method for concealment of a mission-critical push-to-talk (MCPTT) group identifier in a multimedia broadcast multicast services (MBMS), the method being performed in a MCPTT server, and comprising generating or receiving (S300) a MCPTT group alias; and sending (S310) the MCPTT group alias to a user equipment (UE), which MCPTT group alias is used instead of a MCPTT group identity in MCPTT group call communication.
19. A user equipment (UE) for concealment of a mission-critical push-to-talk (MCPTT) group identifier in a multimedia broadcast multicast services (MBMS), the UE (1) comprising a processor (16); and a computer program product (12, 13) storing instruction that, when executed by the processor, causes the UE to receive an indication of a MCPTT group alias from a group management server (GMS), which MCPTT group alias is used instead of a MCPTT group identity in MCPTT group call communication.

20. The UE according to item 19, wherein the indication of a MCPTT group alias is received in a group notification message.
21. The UE according to item 20, wherein the group notification message is a MIKEY-SAKKE I MESSAGE.
22. The UE according to item 21, wherein the MCPTT group alias is retrieved from a general extension payload of the message.
23. The UE according to item 20, wherein the MCPTT group alias is generated from a GMK and the MCPTT group identity retrieved from the message.
24. The UE according to any one of items 19 to 23, wherein the MCPTT group alias is generated randomly.
25. The UE according to item 19, wherein the indication of a MCPTT group alias is received in a client server key (CSK)/signalling protection key (SPK) encrypted message.
26. The UE according to item 25, wherein MCPTT group alias is retrieved from the message.
27. The UE according to item 25, wherein the MCPTT group alias is generated from parameters retrieved from the message.
28. A group management server (GMS) for concealment of a mission-critical push-to-talk (MCPTT) group identifier in a multimedia broadcast multicast services (MBMS), the GMS (10) comprising a processor (20); and a computer program product (22, 23) storing instruction that, when executed by the processor, causes the GMS to send an indication of a MCPTT group alias to a user equipment (UE), which MCPTT group alias is used instead of a MCPTT group identity in MCPTT group call communication.
29. The GMS according to item 28, wherein the indication of a MCPTT group alias is sent in a MIKEY-SAKKE I MESSAGE.
30. The GMS according to item 29, further caused to generate the MCPTT group alias, and wherein the MCPTT group alias is added to a general extension payload of the message.
31. The GMS according to any one of items 28 to 30, wherein the MCPTT group alias is generated randomly.
32. The GMS according to item 28, wherein the indication of a MCPTT group alias is sent in a client server key (CSK)/signalling protection key (SPK) encrypted message.
33. The GMS according to item 32, further caused to generate the MCPTT group alias, and wherein MCPTT group alias is added to the message.
34. The GMS according to item 32, wherein parameters for generation of the MCPTT group alias is added to the message.
35. A user equipment (UE) for concealment of a mission-critical push-to-talk (MCPTT) group identifier in a multimedia broadcast multicast services (MBMS), the UE (1) comprising a processor (16); and a computer program product (12, 13) storing instruction that, when executed by the processor, causes the UE to receive an indication of a MCPTT group alias from a MCPTT server, which MCPTT group alias is used instead of a MCPTT group identity in MCPTT group call communication.
36. A mission-critical push-to-talk (MCPTT) server for concealment of a MCPTT group identifier in a multimedia broadcast multicast services (MBMS), the MCPTT server (5) comprising a processor (20); and a computer program product (22, 23) storing instruction that, when executed by the processor, causes the MCPTT server to generate or receive a MCPTT group alias; and send the MCPTT group alias to a user equipment (UE), which MCPTT group alias is used instead of a MCPTT group identity in MCPTT group call communication.
37. A user equipment (UE) for concealment of a mission-critical push-to-talk (MCPTT) group identifier in a multimedia broadcast multicast services (MBMS), the UE (1) comprising: a communication manager (91) for receiving an indication of a MCPTT group alias from a group management server (GMS), which MCPTT group alias is used instead of a MCPTT group identity in MCPTT group call communication.
38. A group management server (GMS) for concealment of a mission-critical push-to-talk (MCPTT) group identifier in a multimedia broadcast multicast services (MBMS), the GMS (10) comprising a communication manger (101) for sending an indication of a MCPTT group alias to a user equipment (UE), which MCPTT group alias is used instead of a MCPTT group identity in MCPTT group call communication.
39. A user equipment (UE) for concealment of a mission-critical push-to-talk (MCPTT) group identifier in a multimedia broadcast multicast services (MBMS), the UE (1) comprising a communication manager (91) for receiving an indication of a MCPTT group alias from a MCPTT server, which MCPTT group alias is used instead of a MCPTT group identity in MCPTT group call communication.
40. A mission-critical push-to-talk (MCPTT) server for concealment of a MCPTT group identifier in a multimedia broadcast multicast services (MBMS), the MCPTT server (5) comprising a determination manager (100) for generating or receiving a MCPTT group alias; and a communication manager (101) for sending the MCPTT group alias to a user equipment (UE), which MCPTT group alias is used instead of a MCPTT group identity in MCPTT group call communication.
41. A computer program (14, 15) for concealment of a mission-critical push-to-talk (MCPTT) group identifier in a multimedia broadcast multicast services (MBMS), the computer program comprising computer program code which, when run on a user equipment (UE), causes the UE (1) to receive (S100) an indication of a MCPTT group alias from a group management server (GMS), which MCPTT group alias is used instead of a MCPTT group identity in MCPTT group call communication.
42. A computer program (24, 25) for concealment of a mission-critical push-to-talk (MCPTT) group identifier in a multimedia broadcast multicast services (MBMS), the computer program comprising computer program code which, when run on a group management server (GMS), causes the GMS (10) to send (S210) an indication of a MCPTT group alias to a user equipment (UE), which MCPTT group alias is used instead of a MCPTT group identity in MCPTT group call communication.
43. A computer program (14, 15) for concealment of a mission-critical push-to-talk (MCPTT) group identifier in a multimedia broadcast multicast services (MBMS), the computer program comprising computer program code which, when run on a user equipment (UE), causes the UE (1) to receive (S100) an indication of a MCPTT group alias from a MCPTT server, which MCPTT group alias is used instead of a MCPTT group identity in MCPTT group call communication.

44. A computer program (24, 25) for concealment of a mission-critical push-to-talk (MCPTT) group identifier in a multimedia broadcast multicast services (MBMS), the computer program comprising computer program code which, when run on a MCPTT server, causes the MCPTT server (5) to generate or receive (S300) a MCPTT group alias; and send (S310) the MCPTT group alias to a user equipment (UE), which MCPTT group alias is used instead of a MCPTT group identity in MCPTT group call communication.

45. A computer program product (12, 13; 22, 23) comprising a computer program (14, 15; 24, 25) according to any one of items 41 to 44 and a computer readable storage means on which the computer program (14, 15; 24, 25) is stored.

Note that a user equipment (UE) as used herein is any type of radio node capable of communicating with a radio network node or another UE over radio signals. A UE may therefore refer to a machine-to-machine (M2M) device, a machine-type communications (MTC) device, a NB-IoT device, a mobile terminal, a wireless communication device, etc. However it should be noted that the UE does not necessarily have a "user" in the sense of an individual person owning and/or operating the device. A UE may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction. The UE herein can therefore be any type of wireless device capable of communicating with a network node or another UE over radio signals. In some embodiments the UE may be configured with PCell and PSCell or with PCell, PSCell and one or more SCells such as in dual connectivity and/or carrier aggregation. The configured cells are UE specific aka serving cells of the UE.

In an internet of things (IoT) scenario, a UE as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a UE as described herein may be comprised in a vehicle and may perform monitoring and/or reporting of the vehicle's operational status or other functions associated with the vehicle.

Generally, all terms used in the embodiments described herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for concealment of a mission-critical push-to-talk, MCPTT, group identity in multimedia broadcast multicast services, MBMS, the method being performed in a user equipment, UE, and comprising:
    receiving from a group management server, GMS, an indication of an MCPTT group pseudonym which is a pseudonym for an MCPTT group identity that identifies an MCPTT group of which the UE is a member;
    receiving an MBMS subchannel control message on an MBMS subchannel protected by a key accessible to any UE that is a member of at least one MCPTT group whose MBMS subchannel control messages are sent on the MBMS subchannel; and
    determining whether the MBMS subchannel control message is for the MCPTT group of which the UE is a member by determining whether the MBMS subchannel control message includes the MCPTT group pseudonym for the MCPTT group identity that identifies the MCPTT group.

2. The method according to claim 1, further comprising using the MCPTT group pseudonym instead of the MCPTT group identity in an MCPTT group call communication.

3. The method according to claim 1, wherein the MCPTT group pseudonym is defined as a function of certain parameters, and wherein the indication comprises the certain parameters based on which the MCPTT group pseudonym is able to be generated according to the function.

4. The method according to claim 1, wherein the indication comprises the MCPTT group pseudonym itself.

5. The method according to claim 1, wherein the indication of the MCPTT group pseudonym is included in a group notification message sent from the GMS to the UE or included in a client server key (CSK)/signalling protection key (SPK) encrypted message sent from the GMS to the UE.

6. A method for concealment of a mission-critical push-to-talk, MCPTT, group identity in multimedia broadcast multicast services, MBMS, the method being performed in a user equipment, UE, and comprising:
    receiving from an MCPTT server an indication of an MCPTT group pseudonym which is a pseudonym for an MCPTT group identity that identifies an MCPTT group of which the UE is a member;
    receiving an MBMS subchannel control message on an MBMS subchannel protected by a key accessible to any UE that is a member of at least one MCPTT group whose MBMS subchannel control messages are sent on the MBMS subchannel; and
    determining whether the MBMS subchannel control message is for the MCPTT group of which the UE is a member by determining whether the MBMS subchannel control message includes the MCPTT group pseudonym for the MCPTT group identity that identifies the MCPTT group.

7. The method according to claim 6, further comprising using the MCPTT group pseudonym instead of the MCPTT group identity in an MCPTT group call communication.

8. The method according to claim 6, wherein the MCPTT group pseudonym is specific to a group call session in which the UE is a participant.

9. The method according to claim 6, wherein the MCPTT group pseudonym is sent from the MCPTT server to the UE during a call setup procedure.

10. The method according to claim 6, wherein the MCPTT group pseudonym is included in a group call response sent from the MCPTT server to the UE.

11. The method according to claim 6, wherein the MCPTT group pseudonym is defined as a function of certain parameters, and wherein the indication comprises the certain parameters based on which the MCPTT group pseudonym is able to be generated according to the function.

12. The method according to claim 6, wherein the indication comprises the MCPTT group pseudonym itself.

13. A method for concealment of a mission-critical push-to-talk, MCPTT, group identity in multimedia broadcast multicast services, MBMS, the method being performed in an MCPTT server, and comprising:
  sending to a user equipment, UE, an indication of an MCPTT group pseudonym which is a pseudonym for an MCPTT group identity that identifies an MCPTT group of which the UE is a member;
  generating an MBMS subchannel control message to include the MCPTT group pseudonym in order to indicate that the MBMS subchannel control message is for the MCPTT group identified by the MCPTT group identity; and
  sending the MBMS subchannel control message on an MBMS subchannel protected by a key accessible to any UE that is a member of at least one MCPTT group whose MBMS subchannel control messages are sent on the MBMS subchannel.

14. The method according to claim 13, further comprising generating or receiving the MCPTT group pseudonym, and wherein sending the indication of the MCPTT group pseudonym comprises sending the generated or received MCPTT group pseudonym.

15. The method according to claim 13, further comprising using the MCPTT group pseudonym instead of the MCPTT group identity in an MCPTT group call communication.

16. The method according to claim 13, wherein the MCPTT group pseudonym is specific to a call session in which the UE is a participant.

17. The method according to claim 13, wherein the indication of the MCPTT group pseudonym is sent from the MCPTT server to the UE during a call setup procedure.

18. The method according to claim 13, wherein the indication comprises the MCPTT group pseudonym itself.

19. A user equipment, UE, configured for concealment of a mission-critical push-to-talk, MCPTT, group identity in multimedia broadcast multicast services, MBMS, the UE comprising:
  processing circuitry and memory, the memory storing instructions that, when executed by the processing circuitry, cause the UE to:
    receive from a group management server, GMS, an indication of an MCPTT group pseudonym which is a pseudonym for an MCPTT group identity that identifies an MCPTT group of which the UE is a member;
    receive an MBMS subchannel control message on an MBMS subchannel protected by a key accessible to any UE that is a member of at least one MCPTT group whose MBMS subchannel control messages are sent on the MBMS subchannel; and
    determine whether the MBMS subchannel control message is for the MCPTT group of which the UE is a member by determining whether the MBMS subchannel control message includes the MCPTT group pseudonym for the MCPTT group identity that identifies the MCPTT group.

20. A user equipment, UE, configured for concealment of a mission-critical push-to-talk, MCPTT, group identity in multimedia broadcast multicast services, MBMS, the UE comprising:
  processing circuitry and a memory, the memory storing instructions that when executed by the processing circuitry causes the UE to;
    receive from an MCPTT server an indication of an MCPTT group pseudonym which is a pseudonym for an MCPTT group identity that identifies an MCPTT group of which the UE is a member;
    receive an MBMS subchannel control message on an MBMS subchannel protected by a key accessible to any UE that is a member of at least one MCPTT group whose MBMS subchannel control messages are sent on the MBMS subchannel; and
    determine whether the MBMS subchannel control message is for the MCPTT group of which the UE is a member by determining whether the MBMS subchannel control message includes the MCPTT group pseudonym for the MCPTT group identity that identifies the MCPTT group.

21. A mission-critical push-to-talk, MCPTT, server for concealment of a mission-critical push-to-talk, MCPTT, group identity in multimedia broadcast multicast services, MBMS, the MCPTT server comprising:
  processing circuitry and a memory, the memory storing instructions that when executed by the processing circuitry causes the MCPTT server to:
    send to a user equipment, UE, an indication of an MCPTT group pseudonym which is a pseudonym for an MCPTT group identity that identifies an MCPTT group of which the UE is a member;
    generate an MBMS subchannel control message to include the MCPTT group pseudonym in order to indicate that the MBMS subchannel control message is for the MCPTT group identified by the MCPTT group identity; and
    send the MBMS subchannel control message on an MBMS subchannel protected by a key accessible to any UE that is a member of at least one MCPTT group whose MBMS subchannel control messages are sent on the MBMS subchannel.

* * * * *